(12) United States Patent
Bluzer

(10) Patent No.: US 7,064,328 B2
(45) Date of Patent: Jun. 20, 2006

(54) ULTRA SENSITIVE SILICON SENSOR MILLIMETER WAVE PASSIVE IMAGER

(75) Inventor: Nathan Bluzer, Rockville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 335 days.

(21) Appl. No.: 10/689,720

(22) Filed: Oct. 22, 2003

(65) Prior Publication Data
US 2005/0087687 A1 Apr. 28, 2005

(51) Int. Cl.
*H01L 25/00* (2006.01)
*G01J 5/00* (2006.01)
(52) U.S. Cl. .................................. 250/332; 250/338.1
(58) Field of Classification Search ............... 250/352, 250/339.03
See application file for complete search history.

(56) References Cited

U.S. PATENT DOCUMENTS 6,133,572 A 10/2000 Cunningham
6,300,632 B1 * 10/2001 Liu et al. ................. 250/338.4
6,489,615 B1 12/2002 Bluzer

FOREIGN PATENT DOCUMENTS

FR WO 00/40937 7/2000
JP 2002 296121 A 10/2002

* cited by examiner

*Primary Examiner*—Albert Gagliardi
(74) *Attorney, Agent, or Firm*—Birch, Stewart, Kolasch & Birch, LLP

(57) ABSTRACT

Electro-thermal feedback is utilized for zeroing the thermal conductance between a bolometer type detector element of a pixel in a thermal radiation sensor assembly and the environments through its mechanical support structure and electrical interconnects, thereby limiting the thermal conductance primarily through photon radiation. Zeroing of the thermal conductance associated with the mechanical support and electrical readout interconnect structures is achieved by electro-thermal feedback that adjust the temperature of an intermediate stage by the heating effect of a bipolar transistor amplifier circuit so that the temperature across the mechanical support and electrical interconnects structures are zeroed thereby greatly improving the thermal isolation, the responsivity and sensitivity of the electromagnetic radiation sensor.

30 Claims, 7 Drawing Sheets

ULTRA SENSITIVE SILICON SENSOR MILLIMETER WAVE PASSIVE IMAGER

BACKGROUND OF THE INVENTION

1. Field of the Invention

This invention relates generally to bolometer type sensors for detecting thermal radiation and more particularly to ultra sensitive silicon bolometer type sensors usable for passive or active imaging at millimeter (MM) wavelengths.

2. Description of Related Art

Infrared (IR) bolometers are used and proposed for use in many new applications. The principal application is construction of thermal cameras. Interest in bolometers stems from the fact that their performance has significantly improved, they're sensitive at much longer wavelengths, and offer higher operating temperatures. Specifically, IR cameras, with large bolometer arrays have achieved a sensitivity, a Noise Equivalent Temperature resolution (NEΔT) better than ≈0.1K. Such performance is less than that of quantum detectors, however, for many applications it is adequate and cost effective. Improved bolometer performance is achieved primarily through improved thermal isolation, made possible with advances in IC micro-machining technology. The thermal isolation achieved is about an order of magnitude from radiation limited isolation.

Bolometers inherently operate at slower rates than quantum detectors. However, with staring focal plane arrays, the slow speed limitation is alleviated, since the pixel integration times correspond to the frame rate, and is much longer than line times in scanning systems. Thus the main obstacle to making bolometers more sensitive are practical limitations in thermally isolating each pixel element. With improved thermal isolation, the bolometers performance will directly improve and thereby find wider applications, including potential replacement for cryogenic FLIR cameras. With ideal thermal isolation, the anticipated NEΔT improvement is about an order of magnitude in sensitivity.

LWIR and MWIR silicon bolometers having a new operating mode are disclosed in U.S. Pat. No. 6,489,615 entitled "Ultra Sensitive Silicon Sensor", issued to Nathan Bluzer, the present inventor, on Dec. 3, 2002. This patent is assigned to the present assignee and is incorporated herein by reference in its entirety.

In U.S. Pat. No. 6,489,615, electro-thermal feedback is utilized for removing thermal conductance between an absorber element of a bolometer pixel in a thermal radiation sensor assembly and the environments through its mechanical support structure and electrical interconnects, thereby limiting the thermal conductance primarily through photon radiation. Zeroing the thermal conductance associated with the mechanical support structure and electrical interconnects is achieved by electro-thermal feedback that adjust the temperature of an intermediate stage and the mechanical support structure as well as the electrical interconnects to equal the bolometer's absorber element temperature.

SUMMARY

Accordingly it is an object of the present invention to provide an improvement in electromagnetic radiation sensors.

It is a further object of the invention to provide an improvement in radiation sensors for detecting thermal radiation in the millimeter (MM) wave spectrum.

It is yet another object of the invention to provide an ultra sensitive silicon MM wave sensor including electrothermal feedback for providing passive imaging of an object through various types of environments.

And it is yet a further object of the invention to provide an ultra sensitive silicon sensor adapted for operation for example at, but not limited to, 30 GHz, 94 GHz, and 220 GHz.

These and other objects are achieved by a method and apparatus including a two tier ultra sensitive silicon sensor comprising: a heat bath for the sensor; an antenna element for receiving thermal radiation; an absorber element coupled to the antenna element for detecting thermal radiation; and an intermediate stage for thermally isolating the absorber element from the heat bath. The antenna is directly mounted on the heat bath approximately coplanar with the absorber element and the intermediate stage. Support elements mutually separate the absorber element, the intermediate stage, and the heat bath. The intermediate stage includes a electro-thermal feedback circuit including a transistor ampifier for reducing the thermal conductivity between the absorber element and the heat bath by causing the temperature of the intermediate stage to converge to the temperature of the absorber element when detecting thermal radiation, effectively causing the thermal conductance of the support elements to attain a minimum conductance value and thereby maximize the sensitivity of the absorber element to the thermal radiation limit. Temperature sensing is achieved by using the forward voltage of a diode in place of the heretofore used thermal EMF voltage. A plurality of these sensors are intended to fuse in an imaging array.

Further scope of applicability of the present invention will become apparent from the detailed description provided hereinafter. It should be understood, however, the detailed description and the specific examples, while indicating the preferred embodiments of the invention are made by way of illustration only, since various changes and modifications coming within the spirit and scope of the invention will become apparent to those skilled in the art from the detailed description.

BRIEF DESCRIPTION OF THE DRAWINGS

The present invention will become more fully understood when considered in conjunction with the accompanying drawings which are provided by way of illustration only and are thus not meant to be considered in a limiting sense, and wherein.

DETAILED DESCRIPTION OF THE INVENTION

With improved thermal isolation, performance of bolometers will directly improve and thereby open a wider range of applications, such as the application of bolometers as passive millimeter (MM) wave staring imagers. Accordingly, means are now presented for greatly improving the thermal isolation in bolometers. This requires within each bolometer pixel, the zeroing of the thermal conductance of an MM pixel between the detector and its mechanical support and readout structures. Achieving improved thermal isolation to the radiation limit will lead to at least a ten-fold improvement in performance. Zeroing the thermal conductance associated with the mechanical support and readout structures is achieved in the subject invention by introducing an improved intermediate stage and electrical-thermal feedback over that shown and described in U.S. Pat. No. 6,489,615 which vary the temperature of the intermediate stage to track changes in the detector's temperature thereby zeroing the net heat flow through the mechanical support and readout structures. This electrical-thermal feedback between the temperatures of the intermediate stage and the detector is achieved, moreover, in an ultra sensitive silicon sensor (USSS) which can be used in passive millimeter wave imagers. The advantages and performance provided by this invention will become evident from the analysis to follow. We begin by first reviewing the performance and limitations of conventional bolometers and then follow with the performance and advantages of the ultra sensitive silicon sensor (USSS).

Conventional Bolometers

Figure 1:
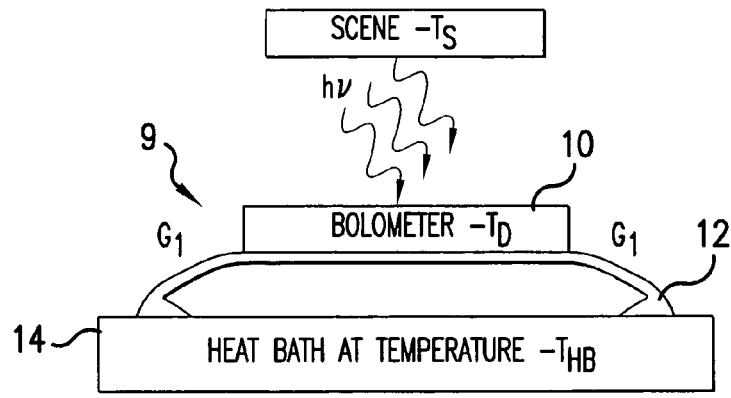
FIG. 1 is a diagram illustrative of a conventional bolometer type sensor which is attached to a thermal isolation bridge sitting on top of a substrate including a heat bath.
Figure 2:
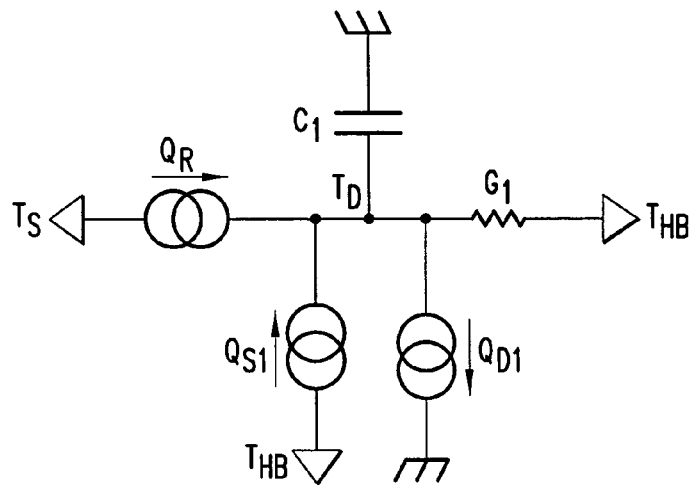
FIG. 2 is a thermal equivalent circuit for the bolometer shown in FIG. 1.

A conventional bolometer pixel, and its thermal equivalent circuit, are shown in FIGS. 1 and 2. The bolometer pixel 9, as shown in FIG. 1, includes an absorber element or detector 10, represented by a rectangle with area that is mechanically supported by a low thermal conductance bridge 12, which sits atop of and is anchored to a thermal bath member 14 having a temperature $T_{HB}$. Radiation power hv incident on the detector 10 from a scene Ts is absorbed and changes the detector's temperature by $\delta T_D$, from $T_D$. As shown in FIG. 2, the detector's heat capacity is $C_1$ and the thermal conductance of the bridge 12 to the heat bath 14 is $G_1$. The scene, at temperature $T_S$, is radiating energy hv at the detector 10 and this is represented in FIG. 2 as a thermal current $Q_R$. The detector 10, in addition to being mechanically attached to the heat bath 14 by the bridge's thermal conductance $G_1$, is radiating power $Q_{D1}$ and receiving $Q_{S1}$, from the shields, not shown.

For the following analysis which involves the thermal equivalent circuit shown in FIG. 2, radiation power is represented as current source $Q_1$, $Q_{S1}$ and $Q_{R1}$, the thermal conductance between the heat bath 14 at $T_{HB}$ and detector 10 at $T_D$ as a thermal resistance with a conductance $G_1$. The temperatures $T_S$, $T_D$, $T_{HB}$ are treated as voltages. With such an equivalent model, the performance of the bolometer pixel 9 (FIG. 1) can be analyzed with the well developed techniques used for electronic circuits as follows.

Signal Level in Conventional Bolometers

The detector's signal is dependent on the absorbed incident photon flux power, and this is given by $Q_R = \sigma T_S^4 A_D / 4F^2$, where $\sigma = 5.6697 \times 10^{-8}$ W-m$^{-2}$-K$^{-4}$, $T_s$ is the scene temperature, and F is the optic's F#. Additionally, radiation power is incident onto the detector 10 from the shields, and it is given by $Q_{S1} = \sigma T_{HB}^4 A_D [1 - 1/4F^2]$. Similarly, the detector 10 radiates power to the environment, and this is given by $Q_{D1} = \sigma T_D^4 A_D$. Functional differences between the expression for $Q_R$, $Q_{D1}$, and $Q_{S1}$ are because the radiated power is through different solid angles, accounted for by the lens's F#. Additionally, the detector 10 also conducts thermal energy, through conductance $G_1$, to the heat bath 14, at temperature $T_{HB}$.

Analytically, the thermal conditions at the bolometer are represented as:

$$Q_R - Q_{DI} + Q_{SI} = \int_{T_{HB}}^{T_D} G_1(T) dT + \int_{T_D}^{T_D + \delta T_D} j\omega C_1(T) dT \quad (1)$$

$$= \sum_{n=0}^{\infty} \left[ \frac{\partial^n G_1(T_{HB})}{\partial T_{HB}^n} \frac{(T_D - T_{HB})^{n+1}}{(n+1)!} + j\omega \frac{\partial C_1(T_D)}{\partial T_D^n} \frac{(\delta T_D)^{n+1}}{(n+1)!} \right]$$

The temperature dependence of $G_1(T)$ and $C_1(T)$ have been included in Equation 1. For conventional bolometers shown, for example, in FIG. 1, it is assumed that the derivatives of $G_1(T)$ and $C_1(T)$ are a weak function of temperature and for simplicity only first order terms are retained. At equilibrium, or constant radiation power conditions, the detector's equilibrium temperature $T_D^0$ is obtained from Equation 1, for $\omega = 0$, and is given by:

$$T_D^0 = T_{HB} + \frac{Q_R + Q_{SI} - Q_{DI}}{G_1 + 0.5 \frac{\partial G_2(T)}{\partial T}(T_D^0 - T_{HB})} \quad (2)$$

Thus, at equilibrium, the detector's temperature will be different from the heat bath temperature by the net power flow divided by the conductance $G_1$, measured at $T_D^0$. As expected, the more power received by the detector 10, the higher will be its operating temperature, since it is directly proportional to the incident power, $Q_R + Q_{S1} > Q_{D1}$. Since $Q_{S1}$ is fixed in temperature, the detector's temperature will change monotonically with changes in scene temperature $T_S$; and changes in the detector's temperature are maximized with minimum conductance $G_1$.

Under dynamic conditions, a detector's operation is characterized by relating dynamic changes in the scene's temperature $\delta T_S$ to dynamic changes in the bolometer's temperature $\delta T_D$, about the thermal equilibrium temperature $T_D^0$. We assumed that the radiation shield is held at a constant temperature $\delta T_{HB}=0$, hence no contribution are made by $\partial Q_{S1}/\partial T=0$. Taking the differential of remaining terms in Equation 1, at temperature $T_1^0$, we obtain a relationship between $\delta T_D$ and $\delta T_S$ given by:

$$\delta T_D = \frac{G_R}{G_{DI} + G_2} \frac{\delta T_S}{\left[1 + j\omega\left(\frac{C_1}{G_{DI} + G_1}\right)\right]} \quad (3)$$

The other variables in Equation 3 are: $G^R = \partial Q_R/\partial T_S = \sigma T_S^3 A_D/F^2$ is the conductance of thermal radiation through space from the scene; $G_{D1} = \partial Q_{D1}/\partial T_1 = 4\sigma T_1^3 A_D$ is the conductance of thermal radiation through space from the detector.

Equation 3 relates the dynamic changes in the scene's temperature $\delta T_S$ to changes in the detector's temperature change $\delta T_D$. The detector's signal $\delta T_D$ is monotonically related to $\delta T_S$, and the maximum signal possible is when $\delta T_S = \delta T_D$. The attenuation from unity gain is represented by coefficient $G_R/[G_{D1}+G_1]$. AC response dependent on the thermal time constant and is given by the radial frequency ($\omega_{TM} = [G_{D1}+G_1]/C_1$. The signal attenuation occurs because a large fraction of power received from the scene (corresponding the detector's footprint on the scene) is drained away through conductances $G_{D1}$ and $G_1$. For maximum signal, conductances $G_{D1}$ and $G_2$ should approach in value $G_R$.

Accordingly, much effort has gone into minimizing the thermal conductance $G_1$. Geometrical approaches coupled with selecting materials with poor thermal properties are used toward achieving this goal. Constructing detectors with very small mass minimizes $C_1$ and AC attenuation. However, the size of $C_1$ inversely impacts the thermal noise level at the detector and, therefore, it should not be made arbitrarily small. The maximum signal and minimum noise design criteria, given in terms of $G_{D1}$, $G_1$, and $C_1$, is developed from the noise analysis given below.

Noise Level in Conventional Bolometers

Several noise sources contribute to the total temperature variance at the detector 10 and all these contribute and limit the detector's sensitivity. The noise sources include: (1) variance in the scene's photon power absorbed by the absorber element, $\delta Q_R^2$, (2) variance in the photon power emitted by the absorber element, $\delta Q_{D1}^2$, (3) variance in the radiation shield's photon power absorbed by the detector, $\delta Q_{S1}^2$, (4) variance in the thermal bath 14 temperature, $\delta T_{HB}^2$, and (5) variance in the detector's temperature produced by noise in readout electronics, $\delta T_{EL}^2$.

Each of these noise sources causes sensitivity degradation and they are examined below. The effects of the various noise sources are quantified in terms of their contribution to the detector's temperature variance. Quantification in terms of the detector's temperature variances, is appropriate for the bolometer's sensitivity is typically given in terms of noise equivalent temperature resolution (NE$\Delta$T). Thus, the photon flux variance, from the scene, $\delta Q_R^2$, the detector, $\delta Q_{D1}^2$, and the shields, $\delta Q_{S1}^2$, produce temperature variances at the absorber labeled as: $\delta T_S^2$, $\delta T_1^2$, and $\delta T_{S1}^2$, respectively, and are computed below.

(I.) Scene fluctuations in the power emitted increase the detector's temperature variance. Fluctuations in the scene's output power impose the ultimate limit on the bolometer's sensitivity, represented in terms of NE$\Delta$T. The best, smallest NE$\Delta$T is achieved when all other noise sources, including noise from the detector 10, are much smaller than noise from fluctuations in scene's photon flux. Thus the minimum noise level corresponds to the noise variance $\delta Q^2R$ of the signal power $Q_R$, arriving from the scene and absorbed by the detector 10, and is given by:

$$\delta Q_R^2 = \frac{8A_D\sigma k_B T_S^5 \Delta f}{4F^2} \quad (4)$$

where, $\Delta f$ represents the electrical frequency bandwidth of the detector 10 and $k_B$ is Boltzmann's constant. The denominator accounts for the fact that only a fraction of the signal reaches the detector 10 and the size of the fluctuation is reduced as is the photon signal emitted by the scene.

Fluctuations in the scene output power is readily translated into a temperature variance at the detector 10, and this represents background limited performance. Temperature variance at the detector induced by the scene $\delta T_S^2$ is obtained by combining Equations 3 and 4 and integrating over frequency. Specifically, the temperature fluctuations $\delta T_S^2$, at the detector, is produced by the scene radiation variance $\delta Q_R^2$ and is given by:

$$\delta T_S^2 = \frac{2}{\pi F^2} \int_0^\infty \frac{A_D \sigma k_B T_S^5}{[G_{DI}+G_1]^2 + \omega^2[C_1]^2} d\omega = \frac{G_R}{(G_{DI}+G_1)} \cdot \frac{k_B T_S^2}{C_1} \quad (5)$$

Equation 5 reveals that the temperature variance, induced by the scene on the detector 10, is a product of two factors. The first factor is the ratio of free space conductance to the conductance between the detector 10 and thermal bath 14: $G_R/[G_{D1}+G_1]$. The second factor corresponds to the temperature variance of an object at temperature $T_s$ and with heat capacity $C_1$. For best performance, the noise from the scene should dominate over all other noise sources. This is facilitated with a fast lens (small F#) and minimum conductance $[G_{D1}+G_1]$ (absorber element 10 with good thermal isolation).

(II.) Variance in the detector's temperature $\delta T_1^2$ is produced by several sources, and this includes: (1) thermal conductance $G_1$ between the detector 10 and heat bath 14, (2) radiative conductance $G_{D1}$ between the detector 10 and radiation shields, not shown, and (3) radiative conductance $G_S$ between the detector 10 and scene, just considered. Here, we focus on temperature variances due to thermal conductances $G_1$, and $G_{D1}$.

At the detector 10, the spectral density of temperature variance $\delta T_1^2(f)$ is given in terms of the different conductance paths between the detector 10 and surroundings. The expression for the spectral temperature variance is given as:

$$\delta T_D^2(f) = \frac{4 k_B T_D^2 [G_1 + G_{DI}]}{[G_1 + G_{DI}]^2 + [\omega C_1]^2} \quad (6)$$

The integral of Equation 6 yields the thermodynamic expression $k_B T_D^2/C_1$, corresponding to the temperature variance of an object at $T_D$ with a heat capacity $C_1$. However, this total temperature variance includes contributions from radiative and thermal conductance paths. The radiative part is included by the $G_{D1}$ term in the denominator of Equation 6. Two contributors are included in $G_{D1}$, one from the scene and the other from the radiation shields. Hence, $G_{D1}=G_R+G_{S1}$, where $G_{S1}$ is the conductance between the radiation shield and the detector 10. Performing the integration with respect to radial frequencies ω, we obtain for $\delta T_D^2$:

$$\delta T_D^2 = \frac{1}{2\pi}\int_0^\infty \frac{4k_B T_1^2 [G_1 + G_{DI}]}{[G_1 + G_{DI}]^2 + [\omega C_1]^2} d\omega = \frac{k_B T_D^2}{C_1} \quad (7)$$

Thus the detector's temperature variance, $\delta T_1^2$, reduces to the theoretical temperature variance of an object at temperature $T_D$ and with a heat capacity of $C_1$.

(III.) Fluctuations in power from the antenna 20 and housing (radiation shield), surrounding the absorber element, contribute to the overall temperature variance. Photons from the antenna 20 are indistinguishable from photons form the scene, represented by Equation 4. The temperature variance, produced by these fluctuations, is readily estimated in terms of the radiation conductance between the detector 10 and shield, $G_{S1}=G_{D1}-G_R$. Proceeding as with Equations 6 and 7, the expression for temperature variance $\delta T_{S1}^2$, at the detector 10, due to the radiation shield held at temperature $T_{S1}$, becomes:

$$\delta T_{S1}^2 = \frac{1}{2\pi}\int_0^\infty \frac{4k_B T_{S1}^2 [G_{DI} - G_R]}{[G_1 + G_{DI}]^2 + [\omega C_1]^2} d\omega = \left[\frac{G_{DI} - G_R}{G_1 + G_{DI}}\right]\frac{k_B T_{S1}^2}{C_1} \quad (8)$$

The temperature variance $\delta T_{S1}^2$ is given as a product of two factors. The first factor indicates that this contribution is attenuated by the ratio of $G_{S1}=G_{D1}-G_R$ to the total conductance, $G_{S1}+G_{D2}$. The second factor is the theoretical temperature variance of an object at temperature $T_{S1}$ and with a heat capacity of $C_1$. Typically, the radiation shield's temperature equals to the heat bath 14 temperature, $T_{HB}$. Hence, we typically substitute $T_{HB}$ for $T_{S1}$, in Equation 8.

(IV.) Thermal bath fluctuations contribute to the variance in detector's 10 temperature. The temperature variance $\delta T^{HB2}$ in the temperature of the heat bath 14 $T_{HB}$ (FIG. 1) is given as:

$$\delta T_{HB}^2 = \frac{k_B T_{HB}^2}{C_{HB}} \quad (9)$$

where, $C_{HB}$ is the heat capacity of the heat bath 14. The variance $\delta T_{HB}^2$ can be made small by increasing the mass of the heat bath 14, and in principle this can make $\delta T_{HB}^2$ arbitrarily small relative to the other noise sources. This is particularly important, for the temperature variance in the heat bath is directly coupled to the detector 10. Typically, $G_1>>G_R$, $G_{D1}$, and $G_{S1}$. Hence, with the equivalent circuit in FIG. 2 this provides direct evidence that the variance $\delta T_{HB}^2$ modulates the detector's temperature with a coupling coefficient approaching unity. Thus, for all practical purposes, the temperature variance in the heat bath 14 replicates itself as a variance in the absorber element's temperature and is given by Equation 9.

(V.) Noise in the detector's readout circuits contribute to the detector's temperature variance. The readout circuit noise is given by a voltage squared spectral density $dE_{NA}^2/df$, which includes 1/f and white noise components. In this analysis, this voltage noise is translated to an equivalent variance in temperature at the bolometer. This translation from variances in voltage to variances in temperature facilitates the analysis and the computation of NEΔT. Translating the readout circuit's voltage noise into an equivalent variance in temperature requires consideration of the actual readout circuits and the bolometer. In this analysis, consistent with the fact that resistive bolometers are the most widely used, we analyze the performance of a conventional resistive bolometer.

Resistive Bolometer

The readout circuit's voltage noise corrupts the output from a resistive bolometer, biased with a dc current $I_{CR}$. For improved understanding, the corruption produced by electronic circuit noise is transformed into an equivalent temperature variance. This equivalent variance in the absorber element's temperature, caused by electronic voltage noise, is labeled as $\delta T_{EL}^2$.

Figure 3:
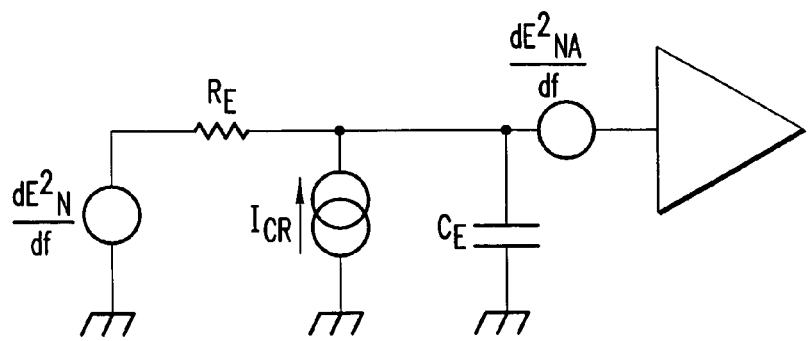
FIG. 3 is an electrical noise equivalent circuit of the sensor shown in FIG. 1.

The total electrical noise presented at the readout circuit, shown in FIG. 3, is a sum of spectral voltage noise variances from the bolometer $dE_N^2/df$ and amplifier $dE_{NA}^2/df$. The voltage noise from the bolometer is filtered by the circuit capacitance $C_E$, and is in series with the noise form the amplifier. The equivalent temperature variance produced by the voltage noise at the readout amplifier's input is:

$$\delta T_{EL}^2 = \frac{1}{\left[I_{CR}\frac{\partial R_{CB}}{\partial T_S}\right]^2} \cdot \frac{1}{2\pi}\int_0^\infty \left[\frac{\frac{dE_N^2}{df}}{1+(\omega C_E R_E)^2} + \frac{dE_{NA}^2}{df}\right] d\omega \quad (10)$$

where, the leading factor in Equation 10 converts the variance in voltage noise to a temperature variance by dividing by $I_{CR}\partial R_{CB}/\partial T_S$, squared, where $\partial R_{CB}/\partial T_S$ represents the resistive temperature coefficient, and $I_{CR}$ is the dc bias current flowing through the bolometer during readout. The second factor in Equation 10 contains the variances of the bolometer and the amplifier's voltage noise spectral density.

For best performance, the bolometer's resistive temperature coefficient $\partial R_{CB}/\partial T_S$ should be made large, for this directly attenuates the contributions of voltage noise to the temperature variance. See Equation 10. Making the bolometer's dc bias current $I_{CR}$ large, helps in principle, but has practical problems in that the associated $I^2R$ heating is much larger (>1000×) that the IR signal and requires pulsed operation (wider noise bandwidth) of the absorber element's readout circuits. Additional noise reduction is achieved by selecting readout amplifiers with spectral voltage variances $dE_{NA}^2/df$ smaller than the bolometer's $dE_N^2/df$. Such conditions are facilitated with large resistance bolometers. Typically, the bolometer's resistance is greater than 10KΩ, which represents a white noise voltage spectral density of 12.9 nV/Hz$^{1/2}$. This value does not include 1/f noise terms which complicate the integration of Equation 10. If we assume that only the white noise from the bolometer dominates, then Equation 10 can be readily integrated and the result is given by:

$$\delta T_{EL}^2 = \frac{1}{\left[I_{CR}\frac{\partial R_{CB}}{\partial T_S}\right]^2} \cdot \frac{0.25}{C_E R_E}\left[\frac{dE_N^2}{df}\right] \quad (11)$$

For the purpose of calculations, we can increase the value of $dE_N^2/df$ to compensate for 1/f noise components, and we choose to use 0.1 μV/Hz$^{1/2}$ for the value of $d^2E_N/df$. It should be also noted that the value of Equation 11 is proportional to the electrical readout bandwidth given as $\omega_{EL}=1/C_E R_E$. Ideally, $\omega_{EL}$ should equal the thermal mechanical bandwidth $\omega_{TM}=[G_{D1}+G_1]/C_1$. Typically, the thermal mechanical bandwidth is narrower than the electrical readout bandwidth ($\omega_{EL}>\omega_{TM}$) by a constant factor $K_{BW}$, so that ($\omega_{EL}=K_{BW}\omega_{TM}$).

The bolometer's total temperature variance $\delta T_T^2$ is simply the sum of Equations 5, 7, 8, 9 and 10. If we assume d $E_N^2$/df is constant with frequency and after some rearrangements, the equation for $\delta T_T^2$ is given by:

$$\delta T_T^2 = \left(\frac{k_B T_S^2}{C_1}\right) \cdot \left(\frac{G_R}{G_{DI}+G_1}\right) \cdot \left\{1 + \left(\frac{G_1+G_{DI}-G_R}{G_R}\right)\frac{T_D^2}{T_S^2} + \frac{C_1}{C_{HB}}\left(\frac{G_R+G_1}{G_R}\right)\frac{T_{HB}^2}{T_S^2} + \left(\frac{G_R+G_1}{G_R}\right)\frac{C_1}{k_B T_S^2}\frac{0.25\frac{dE_N^2}{df}}{\left(I_{CR}\frac{\partial R_{CB}}{\partial T_S}\right)^2}\right\} \quad (12)$$

Equation 12 had been cast into this form to reveal the relative values of every noise source relative to the noise present in the signal. Equation 12 is made up of a product of three terms. The leading factor is the minimum thermodynamically possible temperature variance at a detector, limited by the detector's heat capacity and scene temperature. The second factor shows how this minimum temperature variance is increased since the detector's thermal isolation is not as good as the conductance between the scene and the detector. The third factor, in the braces, includes different noise sources which increase the absorber element's overall temperature variance. When the expression in the braces equals one, the dominant noise is scene noise.

The temperature resolution of the bolometer is limited by the variance, given by Equation 12, and is simply equal to the standard deviation: the square root of Equation 12. Combining this with the signal amplitude (given by Equation 3) the bolometer's performance is determined. The bolometer's performance in terms of NE$\Delta$T is calculated below.

Sensitivity of Conventional Bolometers

The sensitivity of bolometers is given in terms of their temperature resolution NE$\Delta$T. The NE$\Delta$T is the minimum temperature the bolometer can resolve and occurs when the absolute signal to noise ratio is unity. The signal to noise ratio is readily calculated with Equations 3 and 12. The signal to noise ratio equals the signal induced temperature change in the bolometer, given by Equation 3, divided by the RMS fluctuation in the bolometer's temperature, given by the square root of Equation 12. For unity signal to noise ratio, solving for $\delta T_S$, the equation obtained for NE$\Delta$T is:

The expression for NE$\Delta$T has been simplified by incorporating into Equation 13 $\omega_{TM}=[G_{D1}+G_1]/C_1$ and $\omega_{EL}=1/R_E C_E$. Thus, NE$\Delta$T is expressed as a product of three factors. The first factor represents the low frequency thermodynamic sensitivity limit determined by: the thermal bandwidth $\omega_{TM}$, and $G_R$, dependent on the optics F#, the detector size $A_D$, and the scene temperature $T_S$. The second factor indicates how the sensitivity decreases with frequency ($\omega_{TM}=[G_1+G_1]/C_1$. The third factor includes the contributions from various noise sources: (1) noise in the scene signal, (2) noise from the bolometer, including radiation shields, (3) noise from the thermal bath, and (4) noise from the electronic readout circuits.

The NE$\Delta$T is expressed as a product of three factors in Equation 13. Maximum sensitivity, i.e., the smallest NE$\Delta$T, is achieved by minimizing each of these factors. The middle factor in Equation 13 represents the radial frequency dependence of NE$\Delta$T. Optimally, the thermal radial cut-off frequency $\omega_{TM}$ should be made equal to the system frame rate. Setting $\omega_{TM}$ at the system frame rate will maximize the system's dc sensitivity and this is evident from the first factor in Equation 13. The First factor in Equation 13 dictates that for maximum sensitivity: (1) $\omega_{TM}$ be set at a minimum, (2) the optics F# should be as small as possible (fast optics), and (3) the absorber's size $A_D$ should be as large as possible, while satisfying system resolution requirements. The third factor explicitly includes all the noise terms and for best sensitivity it should be minimized to unity.

The steps required to minimize the third factor to unity are revealed by examining in detail each of the noise terms. The noise: terms in the third factor are divided into three groups. The first group represents radiation noise from the scene and the absorber (including radiation shields) noise. The minimum noise occurs if the scene noise dominates. This is facilitated by using a small F# (fast optics), operating the detector $T_D$ and radiation shields $T_{HB}$ colder than the scene temperature $T_S$; however, for equilibrium detectors this is not possible since ideally the detector and scene are in thermal equilibrium.

The middle term in the third factor in Equation 13, represents heat bath noise contributions, coupled through thermal contact $G_1$, to the detector. Reduction of the heat bath noise contributions are readily minimized by making $C_{HB}>>C_1$. By making the heat capacity sufficiently large, the heat bath noise is severely reduced and no other steps are needed to achieve further reductions.

The bottom term in the third factor in Equation 13 represents the readout electronics noise contribution to the detector. Reducing the readout electronics noise below the scene noise in the signal is difficult. The difficulty becomes evident by quantitively examining the bottom term in third factor in Equation 13. Optimistically, let's assume that the noise from the resistive bolometer dominates, and typically for a $10^4\Omega$ resistor the noise $dE_N^2/df$ is about $2\times10^{-16}V^2/Hz$.

$$NE\Delta T = \sqrt{\frac{\omega_{TM} k_B T_S^2}{G_R}} \sqrt{1+\left(\frac{\omega}{\omega_{TM}}\right)^2} \quad (13)$$

$$\left\{1 + \left(\frac{G_1+G_{DI}-G_R}{G_R}\right)\frac{T_D^2}{T_S^2} + \frac{C_1}{C_{HB}}\left(\frac{G_{DI}+G_1}{G_R}\right)\frac{T_{HB}^2}{T_S^2} + \frac{C_2}{k_B T_S^2}\left(\frac{G_{DI}+G_1}{G_R}\right)\frac{\frac{\omega_{EL}}{4}\frac{dE_N^2}{df}}{\left(I_{CR}\frac{\partial R_{CB}}{\partial T_S}\right)^2}\right\}^{1/2}$$

This does not include 1/f noise that makes things even worse. In resistive bolometers, $\partial R_{CB}/\partial T_S \approx 200\Omega/K$ and $G_1/G_{D1} 10$. For: $T_S \approx 300K$, $T_1 \approx 213K$, $A_D = 0.25 \times 10^{-4}$ cm$^2$, and F=1; we evaluate the bottom term in the third factor in Equation 13, and obtain: $(\omega_{EL}/\omega_{TM})1.3 \times 10^{-9}/I_{CR}^2$. This expression, for the electronic noise contribution, should be significantly less than 1 to make electronic noise insignificant. If $(\omega_{EL}/\omega_{TM})=1$, the required circuit current $I_{CR} >> 0.04$ mA. If the 1/f noise is included, the required current level is probably $I_{CR} > 1$ mA. With $I_{CR} \approx 1$ mA, during readout, the I$^2$R power delivered is about 10 mWatts, verses 0.1 µWatts delivered from the scene This means the readout I$^2$R power is 100 thousand times greater then the power in the signal. This is unacceptable for it introduces thermal stability problems, which can be reduced by reducing readout circuits operational duty cycle. In a staring array, with 400×500 elements, for example, the readout duty cycle can be reduced by up to $2 \times 10^5$ fold to alleviating thermal problems. However the noise bandwidth is increases inversely with readout duty cycle whereas readout noise decreases as a square of the readout current $I_{cr}$, i.e., $(\omega_{EL}/\omega_{TM})1.3 \times 10^{-9}/I_{cR}^2$. This solution has practical limitations due to the current capacity of the bolometer and the readout circuit's maximum voltage compliance. Thus, increasing the $I_{CR}$ and decreasing the duty cycle provides insufficient improvements but has practical limitations.

It should be emphasized that the analysis presented for IR bolometers is much less demanding compared to passive MM wave imaging. This can be appreciated by examining Equation 12 where all the noise terms are represented at the detector as temperature variances. In the IR case, $G_R \cong 10^{-9}$ W/K and $G_1 \cong 2 \times 10^{-8}$ W/K. Hence the temperature variance will increase by at least $[G_1/G_R]^2 \cong 100$, and this is not including electronic noise. In the MM wave region the equivalent value of $G_R$ is replaced by $G_{AE} \cong 4 \times 10^{-12}$ W/K. The corresponding minimum increase in the temperature variance will increase as $[G_1/G_{AE}]^2 \cong 6 \times 10^6$ or more than 1000 times. This translates the sensitivity of conventional LWIR bolometers from about 25 mK to 25 Kelvin. If electronic readout noise is included, the situation will get even worse. These sensitivity limitations can be overcome with the USSS approach and it is described in the next section.

MM Ultra Sensitive Silicon Sensor

It is evident from the previous discussion on NEΔT (see Equation 13) that the bolometer's sensitivity is reduced by the ratio $(G_{D1}+G_1)/G_R$. Similarly, the photoresponse amplitude, see Equation 3, is also degraded by the ratio $G_R/(G_{D1}+G_1)$. Since $G_{D1}$ and $G_R$ are limited by the optics, performance improvements requires the reduction of the thermal conductivity $G_1$ between the absorber element 10 and the heat bath 14 in FIG. 1. Much effort has been invested into minimizing thermal conductivity $G_1$ by utilizing special materials and geometries. Presently, the value achieved for $G_1 2 \times 10^{-8}$ Watts/K, and this is about ten times larger than $G_{D1}$. In fact, what is needed, is for $G_1$ to be ten times smaller than $G_{D1}$. Given the limitations inherent with material and geometrical approaches, further reductions in $G_1$, thermal conductivity between the bolometer and heat bath, require a different approach.

The present invention is directed to an improved approach whereby an ultra sensitive silicon sensor (USSS), included, for example, in an array of pixels (FIG. 11) is fabricated using only silicon technology and electro-thermal feedback is used to substantially reduce the thermal conductivity $G_1$. With the electro-thermal feedback, a ten fold improvement in the thermal isolation of the bolometer pixel can be achieved, with: (1) associated improvements in NEΔT; and (2) an increase in photoresponse amplitude. The operation and performance advantages of an MM-USSS are detailed below.

We begin by elaborating how electro-thermal feedback provides at least a ten fold reduction in thermal conductivity over prior art approaches based only on optimally low conductivity materials and geometries. This explanation is followed by a calculation of the photoresponse and noise levels of a passive MM-USSS. From these calculations, the MM-USSS sensitivity is computed.

Maximum Thermal Isolation Through Electro-Thermal Feedback

Thermal isolation between the absorber element 10 of a bolometer pixel 9 and heat bath 14 shown in FIG. 1 can be significantly improved with the use of electro-thermal feedback. The concept of electro-thermal feedback has been disclosed in the above referenced Bluzer patent, U.S. Pat. No. 6,489,615. Maximizing thermal isolation through electro-thermal feedback in accordance with the subject invention will now be demonstrated by analysis. The analysis of the MM-USSS in accordance with the subject invention will include ac and dc components; however, for simplicity and clarity, the analysis is limited to a dc response.

Figure 4:
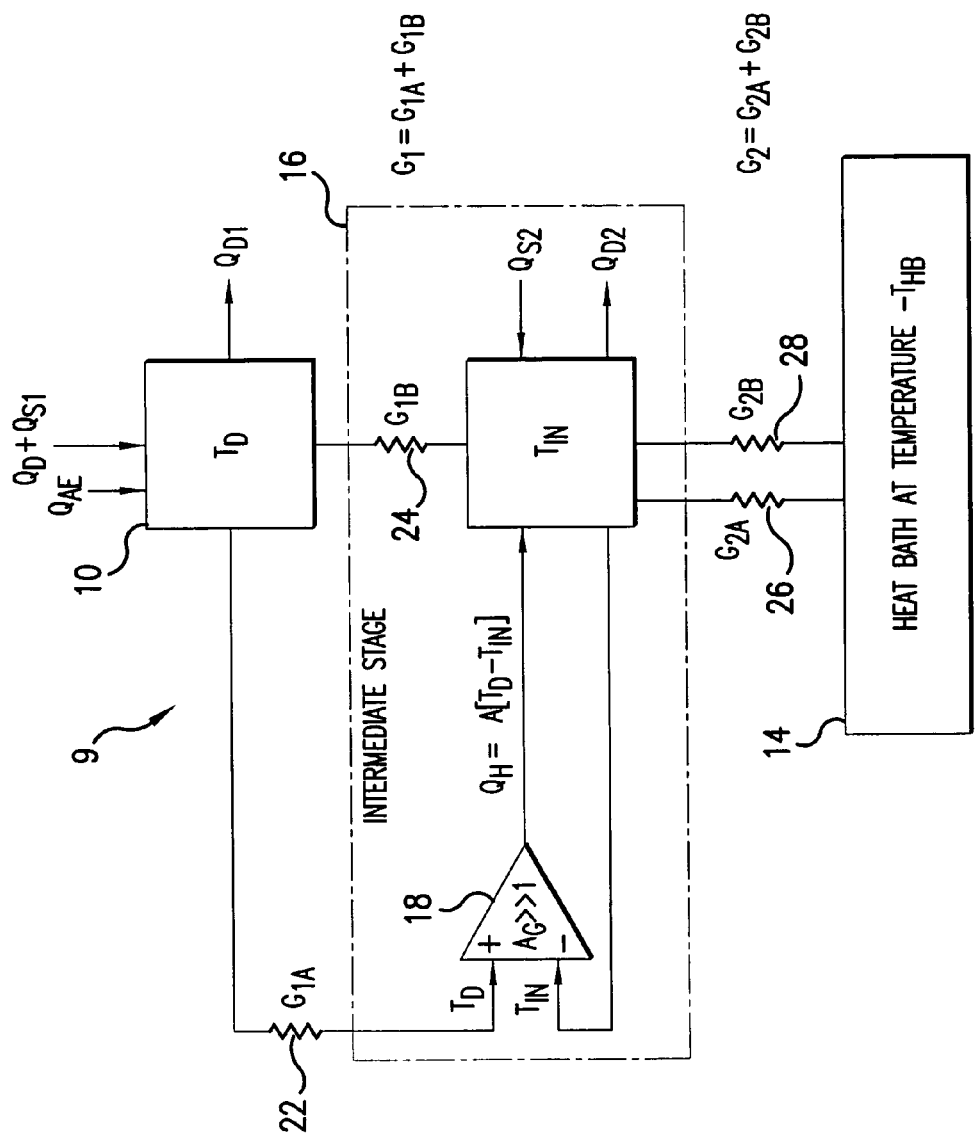
FIG. 4 is an electrical block diagram illustrative of an electro-thermal feedback circuit for a bolometer type sensor in accordance with the subject invention.
Figure 5:
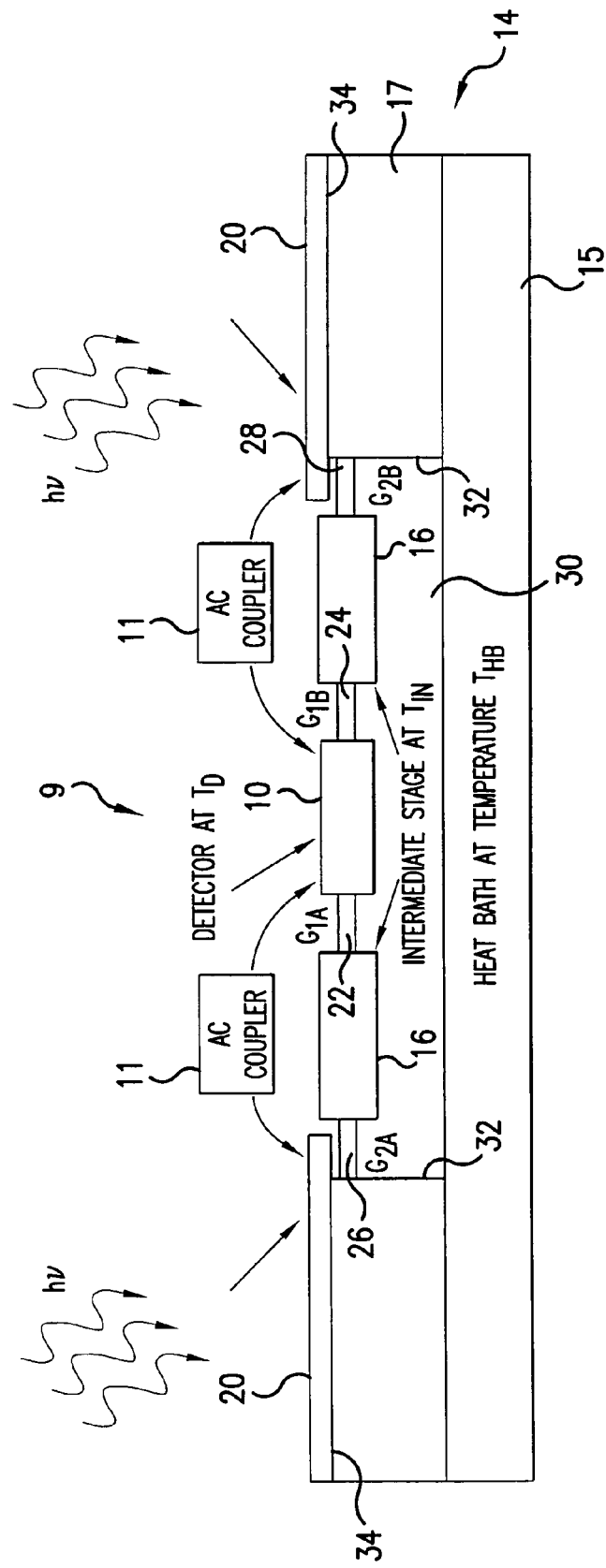
FIG. 5 is a diagram illustrative of a two-tier bolometer type sensor illustrative of the preferred embodiment of the subject invention.
Figure 6:
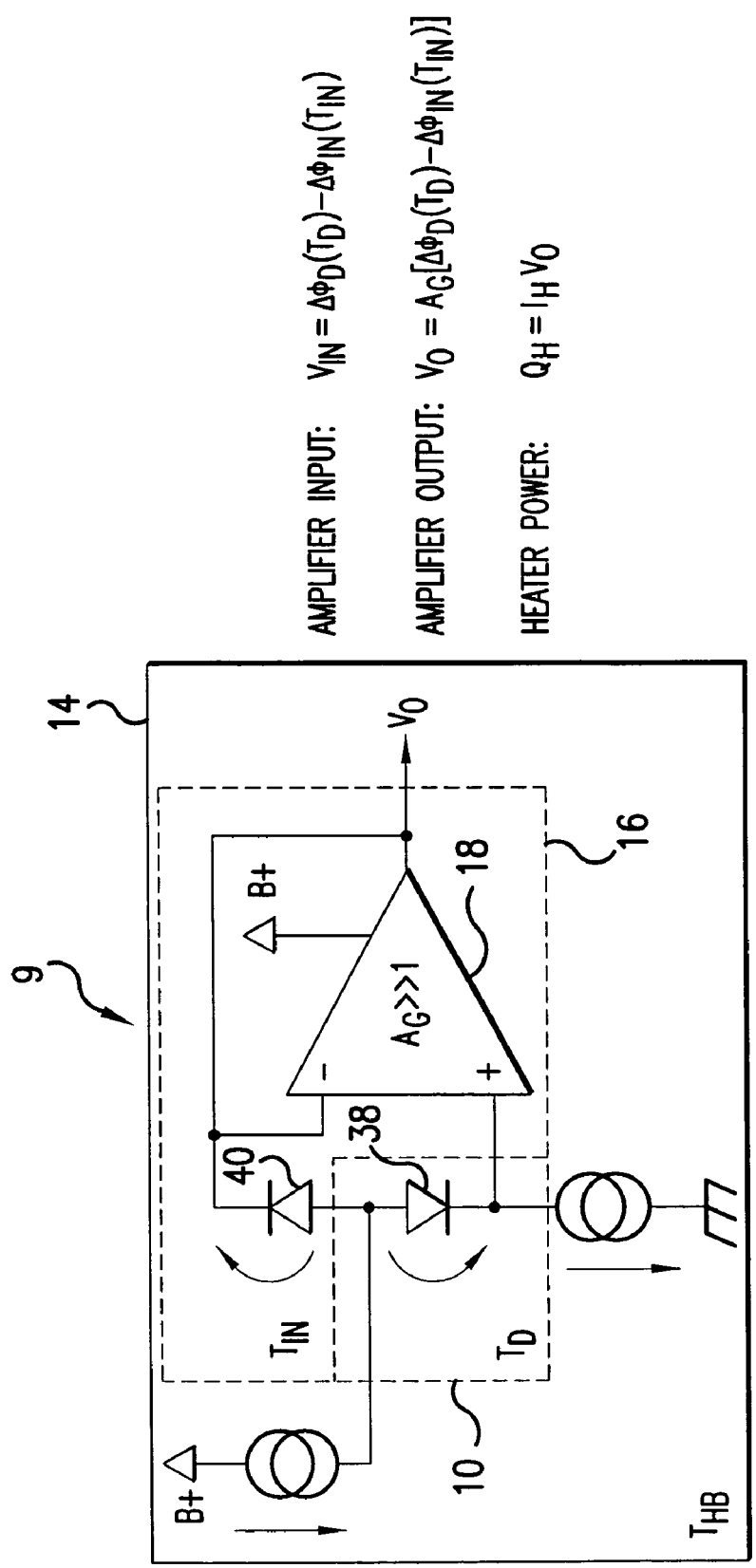
FIG. 6 is an electrical circuit diagram illustrative of the electro-thermal feedback circuit implemented in the bolometer sensor shown in FIG. 5.

Referring now to FIGS. 4–6, shown thereat is a bolometer pixel 9 including an absorber element or detector 10, at temperature $T_D$, thermally connected to the heat bath 14, at temperature $T_{HB}$, thorough an intermediate stage 16 at temperature $T_{IN}$. We assert that by design $T_{HB}$ is always less than $T_D$ and $T_{IN}$. In addition to normal effects, the relationship between $T_D$ and $T_{IN}$ is most influenced by an electro-thermal feedback circuit, represented by an amplifier 18. The amplifier 18 is used to generate heat $Q_H$ in the intermediate stage 16. The generated heat is proportional to the difference between temperatures $T_D$ and $T_{IN}$, specifically, $Q_H = A(T_D - T_{IN})$, where A is the electrical-thermal feedback constant.

The detector 10 at temperature $T_D$ receives radiation in several different ways. In the present invention, the detector 10 receives millimeter (MM) wave radiation $Q_{AE}$ from the scene indirectly from an ac coupled antenna 20 as shown in FIG. 5 and directly by absorbing black body radiation $Q_D$. Also, the detector 10 at temperature $T_D$ receives radiation $Q_{S1}$ from the shields and radiates itself into the environment $Q_{D1}$. The intermediate stage also radiates thermal radiation $Q_{D2}$ while receiving thermal radiation $Q_{S2}$ from the radiation shields. Additionally, links $G_1 = G_{1A} + G_{1B}$ and $G_2 = G_{2A} + G_{2B}$, shown as resistive elements 22, 24 and 26, 28, thermally and electrically interconnect the bolometer pixel 9; the detector 10, the intermediate stage 16, and the heat bath 14, as shown. The effective thermal impedance between the detector 10 and the surrounding includes the effect of electro-thermal feedback. The effect of electro-thermal feedback on thermal isolation is calculated from heat conservation equations. The dc heat conservation equation at the intermediate stage 16 is:

$$(T_D - T_{IN})G_1 + Q_H + Q_{S2} = Q_{D2} + (T_{IN} - T_{HB})G_2 \quad (14)$$

Since the radiation shields and the heat bath 14 are held at the same constant temperature, the terms $Q_{S2}$ and $T_{HB}$ are constant in Equation 14. Taking the differential of Equation 14, the relationship between temperatures $T_D$ and $T_{IN}$ is computed and is given by:

$$\delta T_{IN} = \frac{(G_1 + A)}{(G_1 + G_2 + G_{D2} + A)} \delta T_D \quad (15)$$

where $G_{D2} = \partial Q_{D2}/\partial T_{IN}$ is the radiative conductance from the intermediate stage to it's surroundings, and is given by $$\delta Q_{D2} = G_{D2} \delta T_{IN} = 8\sigma A_{IN} T_{IN}^3 \delta T_{IN} \quad (16)$$

With $A_{IN}$ is the intermediate stage front surface area, and $\sigma = 5.6697 \times 10^{-8}$ W/M$^2$-K$^4$, the Stefan-Boltzmann constant. It should be noted from Equation 15 that if the electrical-thermal feedback constant A is sufficiently large, relative to $G_1$, $G_2$, and $G_{D2}$, any temperature changes in $\delta T_D$ are tracked and almost replicated by $\delta T_{IN}$. The effect of changes in the apparent scene temperature $\delta T_S$, on the detector's $\delta T_D$, is obtained from heat conservation at the detector and is given by:

$$Q_{AE} + Q_D + Q_{S1} = Q_{D1} + (T_D - T_{IN})G_1 \quad (17)$$

Before taking the differential of Equation 17, we proceed to examine each term. The right side of Equation 17 includes the black body radiation $Q_1$ given off by the detector 10, and the power drained through conductance $G_1$. The differential power radiated directly by the detector 10 is given by:

$$\delta Q_{D1} = G_{D1} \delta T_D = 8\sigma A_D T_D^3 \delta T_D \quad (18)$$

Where $A_D$ represents the detectors front surface area. The left hand side of Equation 17 includes three terms, one constant and two variable terms. The term $Q_{S1}$ ($\delta Q_{S1} = 0$) is a constant since the shields are maintained at a constant temperature. The variable terms $Q_D$ represents the black body radiation received by the detector 10 directly and its differential is given as:

$$\delta Q_D = G_D \delta T_S = \frac{2\sigma A_D T_S^3}{F^2} \delta T_S \quad (19)$$

where, F is the optics F-number and Ts is the actual change in scene temperature. The term $Q_{AE}$ represents the MM wave radiation received by the detector 10 from the antenna 20. Since the MM wave energy $h\nu \ll kT_S$, the Planck expressions can be simplified. Integrating the radiation received over the operating frequency bandwidth, we obtain a simple expression and it is given by:

$$Q_{AE} = \frac{\varepsilon \eta A_P k T_S (\nu_2^3 - \nu_1^3)}{3F^2 (c/N)^2} \quad (20)$$

Where: "k" is Boltzmann's constant; "η" represents the antenna efficiency; "c" is the speed of light. "N" is the index of refraction; "$\nu_2 - \nu_1$" is the operating bandwidth of the antenna 20; $A_P$ is the antenna area and is substantially equal to the pixel area; $\epsilon$ is the objects emissivity; and $T_S$ is the scene temperature.

In IR the emissivity is approximated as unity. In the MM wave region the emissivity changes and we can assume, conservatively, that the emissivity varies about $\delta\epsilon/\epsilon \cong 10\%$. Taking the differential of $Q_{AE}$ and including contributions from emissivity and scene temperature variations we obtain:

$$\delta Q_{AE} = \frac{\eta A_P k (\nu_2^3 - \nu_1^3)}{3F^2(c/N)^2}(\varepsilon \delta T_S + T_S \delta \varepsilon) \cong \frac{\eta A_P k (\nu_2^3 - \nu_1^3)}{3F^2(c/N)^2}(\delta T_S + T_S \delta \varepsilon) \quad (21)$$

The right side of equation 21 include a term $\delta T_S + T_S \delta\epsilon = \delta T_{SS}$ where we define $\delta T_{SS}$ as the equivalent radiometric temperature. It should be noted that the equivalent radiometric temperature can be much larger that the actual change in temperature $\delta T_S$. In this analysis for mm wave performance we will be always using the equivalent radiometric temperature $T_{SS}$. Taking the differential of Equation 17, we obtain a relationship between changes in the apparent scene temperatures $T_{SS}$, the detector's temperature $T_D$, and intermediate stage temperature $T_{IN}$ and these are given by:

$$G_{AE} \delta T_{SS} + G_D \delta T_S = (G_{D1} + G_1) \delta T_D - G_1 \delta T_{IN} \quad (22)$$

Where $G_1 = \partial Q_{D1}/\partial T_D$ $G_D = \partial Q_D/\partial T_S$. As will become evident later, we neglect $G_D$ because $G_D < G_{AE}$. Combining Equations 15 and 17, the intermediate stage temperature differential, $\delta T_{IN}$, is eliminated, and we obtain a relationship between $\delta T_{SS}$ and $\delta T_D$ given by:

$$\delta T_D = \frac{G_{AE}}{G_{D1} + G_1 \left(\frac{G_2 + G_{D2}}{G_1 + G_2 + G_{D2} + A}\right)} \delta T_{SS} \approx \frac{G_{AE}}{G_{D1} + \frac{G_2 G_1}{A}} \delta T_{SS} \quad (23)$$

The advantages of electrical-thermal feedback are illustrated by Equation (23). For a large electrical-thermal feedback constant A[A>>{$G_1$, $G_2$, $G_{D2}$}], the denominator in Equation 23 reduces to $G_{D1}$. If no electrical-thermal feedback were utilized [A=0] the denominator in Equation 23 increases to $G_{D1} + G_1 G_2/(G_1 + G_2) \sim 0.5 G_1$. Thus large electrical-thermal feedback severely attenuates the thermal shunting effects produced by $G_1$ and $G_2$, thereby effectively increasing the detector's thermal isolation from $0.5 G_1$ to $G_{D1}$. The increase in thermal isolation is best appreciated if we numerically examine Equation (23).

The numerical values of $G_{AE}$, $G_1$, $G_2$, $G_{D1}$, $G_D$ and $G_{D2}$, are computed with Equations 16, 18, 19, 21. The values for $G_1$ and $G_2$, based on experience, are approximated as $10 G_1 \approx G_2 \approx 10^{-7}$ W/K. We compute (details follow) for A≈10$^{-5}$ W/K. For $A_P$ representing a 1 MM square pixel coupled through an antenna 20 (see FIG. 5) and a lens, not shown, with an index of refraction N=10 and F=1, we obtain $G_{AE} \cong 4.2 \times 10^{-12}$ W/K[assuming a 30 GHz bandwidth, centered at 95 GHz and 100% coupling efficiency]. The detector at temperature $T_D$ will be made small about 5 μm in diameter. It follows that $G_D \cong 6 \times 10^{-11}$ W/K and $G^{D1} \cong 2.4 \times 10^{-10}$ W/K. The value of $G_{D2} \cong 2.4 \times 10^{-9}$ W/K because the intermediate stage will be about 10 times larger in size than the detector. Gathering these numerical values, we examine the two limits of Equation 23: with and without electrical-thermal feedback and obtain:

$$\delta T_D \approx \begin{Bmatrix} 12 \times 10^{-3} T_{SS} & \text{with feedback} \\ 42 \times 10^{-6} T_{SS} & \text{no feedback} \end{Bmatrix} \quad (24)$$

Equation (24) dramatically illustrates the effect of electrical-thermal feedback: for a given change in equivalent radiometric temperature, $\delta T_{SS}$, the response signal at the detector, $\delta T_D$, is increased more than 250 fold because of greatly diminished effects of thermal loading on the detector.

Using the principal of electro-thermal feedback, improved thermal isolation is achieved and the degree of isolation achieved is beyond the isolation possible through optimizing thermal insulating by materials and/or geometrical approaches. Incorporating the principal of electro-thermal feedback, we proceed to present and analyze the performance of a millimeter (MM) wave ultra sensitive silicon sensor (USSS) pixel in accordance with the subject invention.

MM USSS Pixel Embodiments and Operating/Readout Electronics

Figure 9:
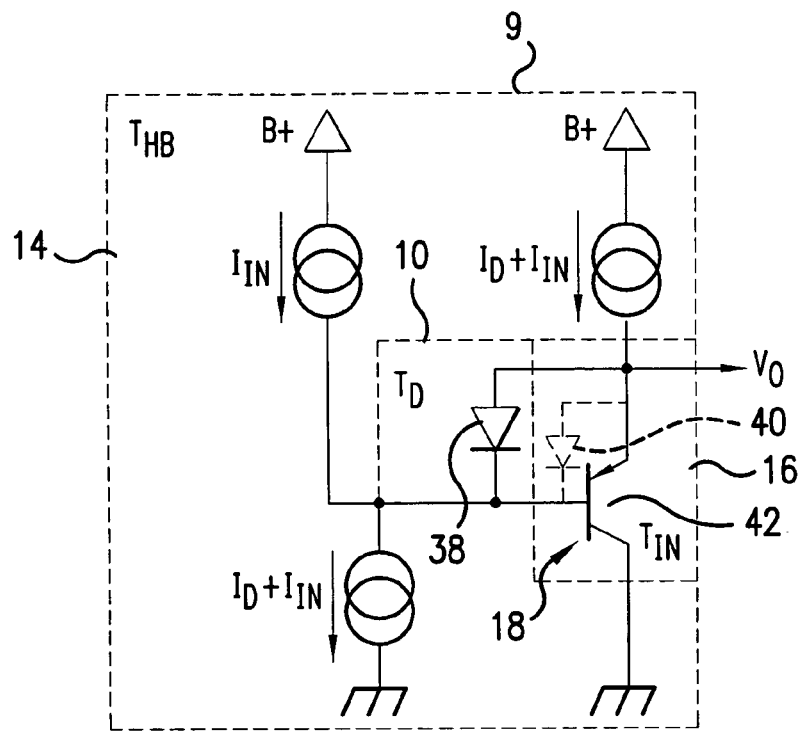
FIG. 9 is an electrical circuit diagram of the bipolar transistor circuitry included in the amplifier shown in FIG. 6.

Incorporation of electro-thermal feedback to form an ultra sensitive silicon sensor in accordance with the subject invention as shown in FIGS. 5, 6 and 9 requires combining special circuits within each bolometer pixel 9. Specifically, electro-thermal feedback requires: (1) a temperature difference sensor, (2) a temperature difference amplifier, (3) a heater with an output dependent on temperature difference, and (4) a structure which incorporates items 1 through 3 into a single pixel.

With respect to (4) above, in FIG. 5, the USSS pixel 9 in accordance with the subject invention utilizes a two-tier design for simplifying fabrication and maximizing area efficiency, and is shown including a detector element 10 at $T_D$ ac coupled via ac coupling means 11 to an antenna 20, and having a flat upper absorber portion with a predetermined surface area, an intermediate stage 16 at $T_{IN}$ adjacent to the detector element 10 and a heat bath 14. The heat bath at $T_{HB}$ includes a substrate portion 15 and an annular upper body portion. Support elements or links 22, 24 and 26, 28 respectively couple the detector 10 to the intermediate stage 16 and the intermediate stage 16 to the upper portion 17 of the heat bath 14, providing conductances $G_{1A}$ and $G_{1B}$ and $G_{2A}$ and $G_{2B}$. The intermediate stage 16 and the detector 10 are substantially coplanar and are mounted in a generally circular cavity 30 of the upper body member 17 of the heat bath 14 being secured to the inner wall surface 32 via the support elements 26 and 28. The antenna element 20 is shown comprising a generally flat member located on the outer surface 34 of the upper body member 17 of the heat bath 14 and is substantially coplanar with the detector element 10 and the intermediate stage 16.

Figure 11:
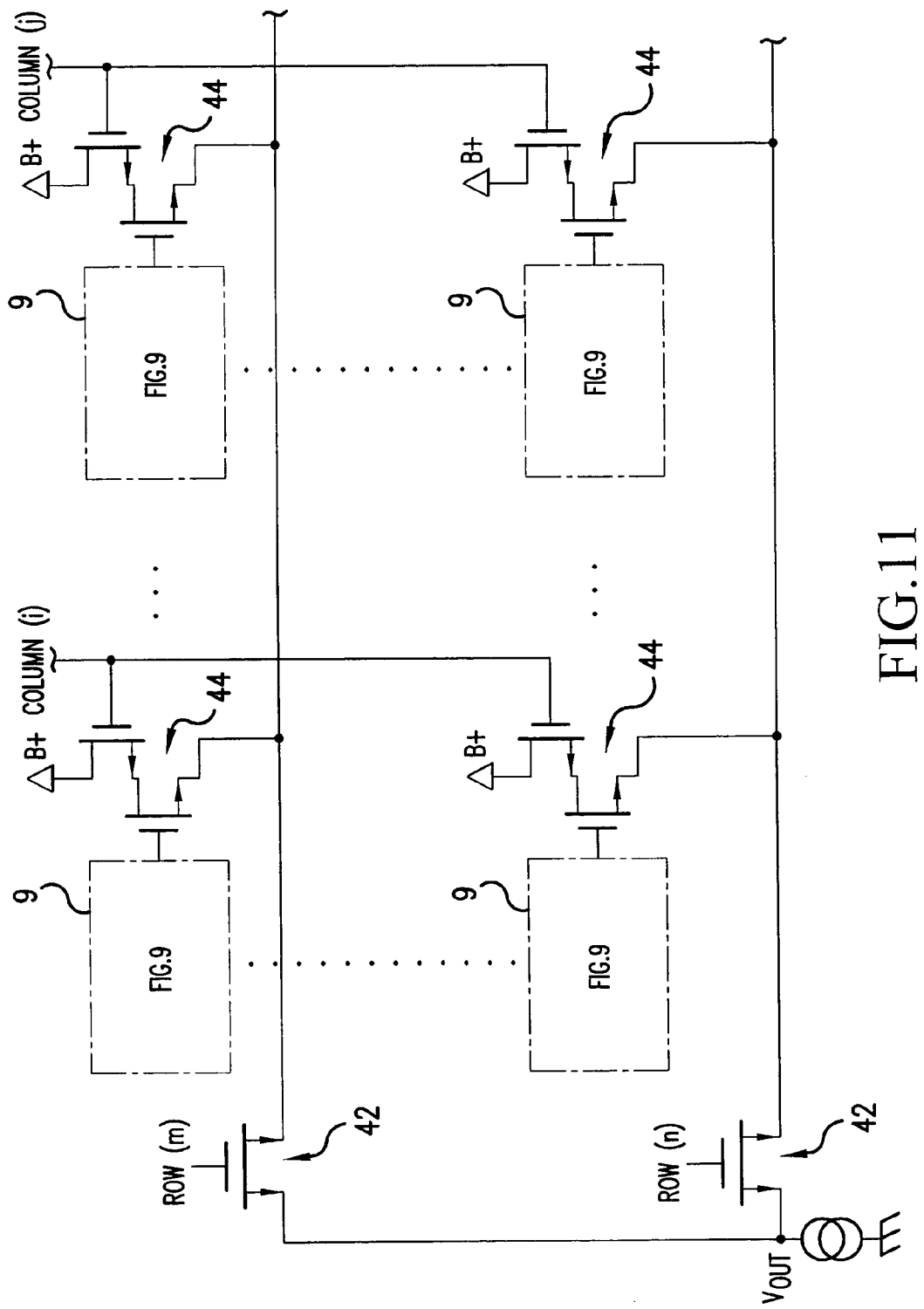

The USSS pixels 9 shown in FIGS. 5 and 9 are intended for incorporation into an array with readout electronics for accessing the output of each individual pixel. An x-y array of pixels 9 is shown in FIG. 11 and includes x-y address switches 42 and 44 for reading out each pixel 9. Conventional address circuits, column and row shift registers utilized with such an array are not shown. Such an array is capable of passively imaging electromagnetic radiation emanating from a scene, for example, at millimeter wavelengths.

Since operation is intended for imaging in the millimeter (MM) wave portion of the electromagnetic spectrum, the pixel size of a pixel 9, as shown in FIG. 5, is on the order of 250 times the size of a pixel shown and described in the above referenced U.S. Pat. No. 6,489,615 and which is intended primarily for operation at LWIR.

The temperature difference sensor in the subject invention utilizes two silicon diodes 30 and 40 connected back to back, to measure the temperature difference between the detector 10 and the intermediate stage 16. One diode 38 is incorporated in the detector 10, and the second diode 40 is incorporated in the intermediate stage 16, as shown in FIG. 6. Biased with a constant current, each of the silicon diodes 38 and 40 exhibit a temperature dependant voltage that follows changes in the Fermi level. The Fermi level's temperature dependence produces a temperature dependent potential difference between the n-side conduction band and the p-side conduction band. The temperature dependent voltage change across a diode, biased with a constant current, is typically about −2.3 mV per degree Kelvin. Utilizing the two diodes 38 and 40, connected back-to-back, as shown in FIG. 6, provides a measure of the temperature difference between the detector 10 and intermediate stage 16. This temperature difference produces an input voltage that is amplified by the amplifier 18, and outputs an output voltage $V_O$.

The amplifier 18 in the subject invention includes a bipolar transistor circuit 42 as shown in FIG. 9 which not only amplifies and provides an output signal $V_O$, but its quiescent power consumption serves as a heater for the intermediate stage 16, thereby mechanizing the electrical-thermal feedback loop. This dual function is made possible by designing the amplifier circuit 18 including the bipolar transistor 42 to operate at equilibrium at a constant current $I_H$. Operating the amplifier 18 at a constant current $I_H$ insures that the output voltage is not only a measure of the temperature difference between the detector 10 and intermediate stages, but also determines the thermal power $Q_H$ delivered to the intermediate stage 16. The thermal power $Q_H$, delivered by the amplifier 18 to the intermediate stage 16, is simply given by:

$$Q_H = I_H V_O = I_H A_G [2.3 mV/K (T_D - T_{IN})] \quad (25)$$

where, $A_G$ is the amplifier's voltage gain and $I_H$ is the amplifiers operating dc bias current. The amplifier's low frequency voltage gain is typically about $10^5$ and $I_H$ is about 1 μA. Since $I_H$ is held constant, as $T_D > T_{IN}$ ($T_D < T_{IN}$) $V_O$ increases (decreases) the amplifier's quiescent power, causing heating (cooling) of the intermediate stage 16. The intermediate stage's bipolar transistor's temperature operation (heating and cooling) is made possible by adjusting the temperature of the heat bath 14 to be always lower that any object in the scene: $T_{HB} < \{T_D, T_{IN}\}$. Thus the combination of the amplifier 18 and heat bath 14 provides the desired bipolar temperature operation.

The differential representation of the electrical-thermal feedback is obtain by taking the differential of equation (25) which is expressed as:

$$\delta Q_H = I_H A_G [2.3 mV/K (\delta T_D - \delta T_{IN})] = A(\delta T_D - \delta T_{IN})$$

The electrical-thermal coefficient, A, is readily evaluated by using $A_G \approx 10^5$, $I_H \approx 10^{-6}$ amp. Substituting these values into equation (26) we obtain $A \approx 10^{-5}$ W/K, and this is much larger than $G_1 = G_{1A} + G_{1B}$ or $G_2 = G_{1A} + G_{1B}$ by about 1000 times.

Thus by utilizing three temperature platforms, i.e., the detector 10 at $T_D$, intermediate stage 16 at $T_{IN}$, and heat bath 14 at temperature $T_{HB}$, the thermal electrical feedback adjusts the power $Q_H$ applied to the intermediate stage 16 to make its temperature, $T_{IN}$, converge to the detector's temperature, $T_D$. Minimizing the temperature difference between the detector 10 and the intermediate stage 16 effectively makes the conductance $G_1 = G_{1A} + G_{1B}$ go to zero.

MM USSS AC Response

Figure 7:
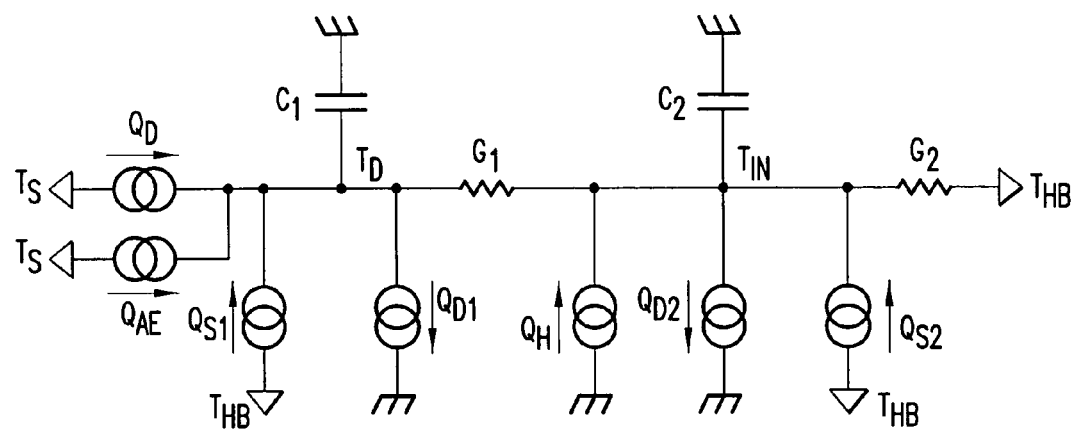
FIG. 7 is a thermal equivalent circuit of the embodiment of the invention shown in FIG. 5.

The AC response is computed from an analysis on a thermal equivalent circuit of FIGS. 5 and 6 as shown in FIG. 7. The analysis follows an approach similar to the analysis previously presented for a conventional bolometer. The analysis implicitly assumes that $T_{HB}$ is always less than $T_D$ and $T_{IN}$. The analysis demonstrates that electrical-thermal feedback severely attenuates the conductance of $G_1$, thereby leading to at least a 25-fold improvement in thermal isolation and increased response. The heat capacity of the detector 10 is represented by $C_1$ and the intermediate stage's heat capacity is represented by $C_2$. $Q_{AE}$ represents the radiation power from the scene delivered through the antenna 20 and coupled to the detector 10. $Q_D$ represents the radiation power directly absorbed by the detector 10. $Q_{S1}$ and $Q_{S2}$ represents the radiation power from the radiation shields absorbed by the detector 10 and the intermediate stage 16. $Q_{D1}$ and $Q_{D2}$ represents the radiation power emitted by the detector 10 and the intermediate stage 16. $Q_H$ is the power delivered by the electrical-thermal feedback circuit.

The thermal balance conditions at the detector 10 and intermediate stages 16 are expressed in terms of two integral equations. At the detector 10, the equation for thermal balance is given by:

$$Q_D + Q_{AE} - Q_{DI} + Q_{SI} = \tag{27}$$

$$-\int_{T_D}^{T_{IN}} G_1(T)dT + \int_{T_D}^{T_D + \delta T_D} j\omega C_1(T_D)dT_D$$

$$= -\sum_{n=0}^{\infty} \left( \frac{\partial^n G_1(T_D)}{\partial T_D^n} \frac{(T_{IN} - T_D)^{n+1}}{(n+1)!} \right) +$$

$$\sum_{n=0}^{\infty} \left( j\omega \frac{\partial^n C_1(T_D)}{\partial T_D^n} \frac{(\delta T_D)^{n+1}}{(n+1)!} \right)$$

Taking the small temperature change limit, the $G_1$ and $C_1$ integrals in Equation 27 are approximated by taking only the Taylor series terms linear with temperature. Using this approximation, and taking the temperature differential of Equation 27, we obtain a simplified expression which is given by:

$$G_{AE}\delta T_{SS} + G_D \delta T_S = [G_1 + G_{D1} + j\omega C_D]\delta T_D - G_1 \delta T_{IN} \tag{28}$$

From previous discussion, we found $G_{AE}\delta T_{SS} >> G_D \delta T_S$, hence $G_D \delta T_S$ can be neglected. Similarly, thermal balance conditions at the intermediate stage give rise to an integral equation given by:

$$-Q_{D2} + Q_H + Q_{S2} = \tag{29}$$

$$-\int_{T_{IN}}^{T_{HB}} G_2(T)dT + \int_{T_{IN}}^{T_{IN}+\delta T_{IN}} j\omega C_2(T_{IN})dT_{IN} + \int_{T_D}^{T_{IN}} G_1(T)dT$$

$$= -\sum_{n=0}^{\infty} \left( \frac{\partial^n G_2(T_{IN})}{\partial T_{IN}^n} \frac{(T_{HB} - T_{IN})^{n+1}}{(n+1)!} \right) +$$

$$\sum_{n=0}^{\infty} \left( j\omega \frac{\partial^n C_2(T_{IN})}{\partial T_{IN}^n} \frac{(\delta T_{IN})^{n+1}}{(n+1)!} \right) +$$

$$\sum_{n=0}^{\infty} \left( \frac{\partial^n G_1(T_D)}{\partial T_D^n} \frac{(T_{IN} - T_D)^{n+1}}{(n+1)!} \right)$$

As in Equation 27, taking the small temperature change limit, the integrals for $G_1$, $G_2$, and $C_2$ are approximated by only the Taylor series terms linear in temperature. Taking the temperature differential of Equation 29 and combining with Equations 26 and 16, we obtain a simplified expression which is given by:

$$[G_1 + A]\delta T_D = [G_1 + G_2 + G_{D2} + A + j\omega C_2]\delta T_{IN} \tag{30}$$

Since $A >> \{G_1, G_2, G_{D2}\}$, it becomes evident from Equation 30 that the electrical-thermal feedback forces $\delta T_D \approx \delta T_{IN}$. Under such conditions the thermal current through $G_1$ is not changed even though the temperature $T_D$ of the detector 10 changes. The improvement in thermal isolation is explicitly revealed combining Equations 29 and 30 to eliminating $T_{IN}$. Combining Equations 29 and 30 to eliminate $T_{IN}$, after some rearrangements we obtain an expression for $T_D$ as a function of $T_{SS}$, specifically:

$$\delta T_D = \frac{G_{AE}}{\left[ G_{DI} + j\omega C_1 + \frac{G_1[G_2 + G_{D2} + j\omega C_2]}{[G_1 + G_2 + G_{D2} + A + j\omega C_2]} \right]} \delta T_{SS} \cong \tag{31}$$

$$\frac{\left[ \frac{G_{AE}}{G_{DI}} \right]}{\left[ 1 + \frac{j\omega C_1}{G_{DI}} \right]} \delta T_{SS}$$

Equation 31 reveals that for large thermal electrical feedback values, $A >> \{G_1, G_2, G_{D2}\}$, the change in radiometric scene temperature $\delta T_{SS}$ is related to $\delta T_D$ by an approximation represented by the right side, of Equation 31. This comes about because the temperature of the intermediate stage 16 of $T_{IN}$ tracks change in the temperature of the detector 10, effectively making the thermal conductance of $G_1$ seem much smaller. Except for limits imposed by noise, the thermal conductance $G_1$ should approach zero as A goes to infinity.

For the values used here, $A \approx 10^{-5}$ W/K (see Equation 26) is much larger than the typical values of $10G_1G_2 \approx 10^{-7}$ W/K. Therefore, actions of the thermal electrical feedback reduces conductance $G_1 \approx 40 G_{D1}$, below the conductance $G_{D1}$. This reduction leads directly to at least a 40-fold response increase, as evident from comparing the denominators in Equations 3 and 31. The increased response is evident from the change in the detector's temperature $\delta T_D$ in response to a change in radiometric scene temperature $\delta T_{SS}$ (see Equation 31). The increased responsivity produces an important benefit, since it provides signals much improved to corruptions by various noise sources, thereby leading directly to improved sensitivity.

The AC temperature response of the detector 10, given by the approximation in Equation 31, is according to the time constant $C_1/G_{D1}$. For TV frame rates, this requires the heat capacity of the detector 10 be minimized. With the antenna 20 as shown in FIG. 5, the size of the detector can be minimized without affecting significantly the MM wave signal. In particular, the size of the detector 10 in accordance with a preferred embodiment of the subject invention as shown in FIG. 5, will be about 5 μM in diameter, much smaller that the anticipated size of the pixel 9, about 1000 μM square. This approach is viable to realizing a time constant consistent with TV frame rates, e.g., 0.167 seconds.

With the interrelationships between $\delta T_D$, $\delta T_{IN}$, and $\delta T_{SS}$, given by Equations 30 and 31, we will now proceed to compute the MM USSS voltage response. The power $Q_H$, delivered by the electrical-thermal feedback amplifier 18 provides the output signal $V_O$. Changes in the power $\delta Q_H$ delivered by the electrical-thermal feedback circuit is related simply to the output signal $\delta V_O$ by the bias current $I_H$, since $\delta Q_H = \delta V_O I_H$, see Equation (26). Incorporating this relationship into Equation 30, and after some rearrangement, we obtain an expression for the output signal dependence on $\delta T_D$, $\delta T_{IN}$, which is given as:

$$\delta V_O I_H = G_1 \delta T_D - [G_1 + G_2 + G_{D2} + j\omega C_2] \delta T_{IN} \tag{32}$$

Voltage responsivity is obtained by eliminating $\delta T_{IN}$ and $\delta T_D$ by replacing them with $\delta T_{SS}$. The replacement is accomplished in two steps. First, using Equation (30), we replace $\delta T_{IN}$ by $\delta T_D$. Second, using Equation (31), we replace $\delta T_D$ by $\delta T_{SS}$. Performing all these substitutions, and after some rearrangements, the MM USSS responsivity is expressed by:

$$\frac{\delta V_O(\omega)}{\delta T_{SS}(\omega)} = \frac{A\frac{G_{AE}}{I_H}}{\left[1 + \frac{(G_1 + A)}{(G_2 + G_{D2} + j\omega C_2)}\right](G_{D1} + j\omega C_1) + G_1} \quad (33)$$

$$\approx \left(\frac{G_2 + G_{D2}}{I_H}\right)\left(\frac{G_{AE}}{G_{D1}}\right)\frac{\left[1 + j\frac{\omega C_2}{G_2 + G_{D2}}\right]}{\left[1 + j\frac{\omega C_1}{G_{D1}}\right]} \text{Volts/Kelvin}$$

The approximations for Equation 33 are made possible by using the fact that $A >> \{G_1, G_2, G_{D2}\}$. Several features become evident by examining Equation (33). The output voltage $V_O$ is a product of two factors and two time constants.

The first factor reveals that the voltage responsivity increases with higher thermal conductance $G_2$ and lower bias current $I_H$. This occurs because for a given change in radiometric scene temperature $\delta T_{SS}$ the power that the amplifier 18 has to deliver to the intermediate stage 16 increases with higher thermal conductance $G_2$. Since $I_H$ is fixed, the only way the amplifier 18 can deliver more power is by increasing the output voltage $V_O$. Hence it appears as though the voltage responsivity has increased, at the cost of more power consumption per each pixel, and or higher dc operating voltage.

Similarly, the voltage responsivity varies inversely with $I_H$ Because, for a given change in radiometric scene temperature $\delta T_{SS}$ and a constant thermal conductance $G_2$, the power that the amplifier 18 has to deliver to the intermediate stage 16 remains constant. As we decrease $I_H$ the amplifiers output voltage needs to increase to keep constant the power delivered.

The two time constants in Equation (33) are a pole, representing the time constant of the detector 10, and a zero, representing time constant of the intermediate stage 16. The time constant of the detector 10 will case the voltage responsivity to decrease. If the detector 10 had zero heat capacity, ($C_1 = 0$) the rise in the detector's temperature would correspond to the radiation power supplied divided by the thermal loading on the detector, given as $G_{D1}$. However, before the detectors temperature can change, the detector's heat capacity, $C_1$, need to receive (it $T_D$ increases) or release (if $T_D$ decreases) energy and this delay manifest itself as a decrease in the ac voltage response.

The second time constant in Equation (33) represents the time constant of the intermediate stage 16. This time constant has the opposite effect to the detector's time constant: it increases the voltage responsivity. This can be understood by examining the operation of the electrical-feedback circuit. If the heat capacity of the intermediate stage 16 is zero, $C_2 = 0$, the temperature rise of the intermediate stage is simply the output power provided by the electrical-feedback circuit (or $V_O I_H$) divided by the thermal loading ($G_2 + G_{D2}$). However, since the heat capacity $C_2 \neq 0$, more (less) power need to be supplied to the intermediate stage 16 for an increase (decrease) in detector's temperature. Hence it follows that the amplifiers output voltage of the amplifier 18 will be larger (smaller) if the intermediate stage temperature needs to increase (decrease) to converge to the detector's temperature $T_D$.

In principle and to first order, the two time constants can be used to extend the frequency response of the MM USSS beyond the detector's time constant. This can be achieved by making the time constant of the intermediate stage 16 equal to the time constant of the detector 10.

Noise Level in MM USSS

The noise sources in the MM USSS of the present invention are all the noise sources present in conventional bolometers; however, additional noise is produced by the electrical-thermal feedback output power $Q_H$. Specifically, the radiation induced thermal fluctuations noises include: scene's flux $Q_S$; radiation shields' $Q_{S1}$ and $Q_{S2}$; the bolometer $Q_{D1}$ of the detector 10; and the $Q_{D2}$ of the intermediate stage 16. We also include thermal fluctuations from the heat bath 14 coupled into the detector 10 through conductance $G_1 = G_{1A} + G_{1B}$ and $G_2 = G_{2A} + G_{2B}$. Finally we include the noise from the electrical-thermal feedback loop. All these noise sources induce temperature fluctuations in the detector's temperature, indistinguishable from a signal. Since the MM USSS output is a voltage signal $V_O$, all the noise terms are itemized and given as a noise voltage.

Specifically, the MM USSS noise is given as RMS voltage fluctuations produced by temperature fluctuations in: (1) the scene, $\delta V_O(T_{SS})$, (2) the heat bath 10, $\delta V_O(T_{HB})$, (3) the detector 10 stage's temperature $\delta V_O(T_D)$, and (4) the intermediate stage's 16 temperature $\delta V_O(T_{IN})$. Additionally, fifth noise term is from the electrical-thermal feedback and readout circuits contained in each MM USSS pixel $\delta V_O(E_L)$. An expression for each one of these noise components is derived and given below.

The overall noise is computed by utilizing the transfer function between the various noise sources and the detector output. We make use of our knowledge of the RMS value of the fluctuations in: radiometric temperature $T_{SS}$, the heat bath temperature $T_{HB}$, the detector stage temperature stage $T_D$, the intermediate stage temperature $T_{IN}$, and the readout electronics. Each RMS value is treated as a standard deviation obtained from a Fourier representation of a particular noise fluctuation. Using the principle of superposition, we use the different transfer function, summed over all frequencies, to compute the contribution of each noise source to the detector's output.

(I.) Fluctuations in the radiometric scene temperature, $\delta T_{SS}$, contributes noise to the MM USSS output $\delta V_O(T_{SS})$, and the transfer function for this contribution is given by Equation (33). For maximum frequency response, we would adjust he pole and zero in Equation (33) to cancel. The noise contribution from spectral fluctuations $\delta T_{SS}(\omega)$ in radiometric scene temperature to fluctuations in the detector's output are approximately given as:

$$\delta V_O(T_{SS}(\omega)) \cong \left[\frac{G_2 + G_{D2}}{I_H}\right]\left[\frac{G_{AE}}{G_{D1}}\right]\delta T_{SS}(\omega) \quad (34)$$

Integrating these contributions over frequency, we obtain the corruption of the detector's output voltage due to RMS fluctuations in the scene temperature $\delta T_{SS}(RMS)$ and it is given by:

$$\delta V_O(T_{SS}) \cong \left[\frac{G_2 + G_{D2}}{G_{DI}}\right]\left[\frac{G_{AE}}{I_H}\right]\delta T_{SS}(\text{RMS}) \quad (35)$$

Thermal conductance ratios at the detector represented by the ratio $G_{AE}/G_{D1} \approx 0.5$ reduces the noise from the scene. However, the signal is also reduced by the same amount thereby increasing susceptibility to corruption by the other noise sources and decreasing the sensitivity.

(II.) Temperature [$\delta T_{HB}$(RMS)] fluctuations of the heat bath 14 produce fluctuations in the output signal of the detector 10. This contribution is calculated by using the fact that according to Equation 26 $\delta Q_H = I_H \delta V_O = A[\delta T_D - \delta T_{IN}]$. Thus, by calculating the change produced by $\delta T_{HB}$(RMS) on $\delta T_D$ and $\delta T_{IN}$ we obtain $\delta V_O(T_{HB})$ with Equation 26. Using superposition, and under the conditions that $\delta T_{HB} \neq 0$ and $\delta T_{SS} = \delta T_S = 0$, we take the differentials of Equations 27 and 29 and obtain the influence of fluctuations in $\delta T_{HB}(\omega)$ on $\delta T_D(\omega)$ and $\delta T_{IN}(\omega)$. Spectral representation is used since we intend to sum the different Fourier noise terms to obtain the RMS value. Taking the differential of Equation 27, and after rearranging to simplify, we obtain:

$$[G_{S1}+j\omega C_{HB}]\delta T_{HB}(\omega)+[G_1]\delta T_{IN}(\omega)=[G_1+G_{D1}+j\omega C_1]\delta T_D(\omega) \quad (36)$$

Repeating the same procedure for Equation 29, we obtain a second equation for the interrelation between the noise terms, and it is given by:

$$[G_2+G_{S2}+j\omega C_{HB}]\delta T_{HB}(\omega)+[G_1+A]\delta T_D(\omega)=[G_1+G_2 G_{D2}+A+j\omega C_2]\delta T_{IN}(\omega) \quad (37)$$

In Equation 37, we used the fact that $\delta Q_H = A[\delta T_D - \delta T_{IN}]$. Solving equations 36 and 37 for $\delta T_D(\omega)$ and $\delta T_{IN}(\omega)$ in terms of $\delta T_{HB}(\omega)$, we compute the spectral variations in the output voltage $\delta V_O(\omega)$ of the amplifier 18 due to the heat bath 14 as:

$$\delta V_O(\omega) = \frac{A}{I_H}\left[\frac{(G_{S1}+j\omega C_{HB}) - (G_{D1}+j\omega C_1)\frac{(G_2+G_{S2}+j\omega C_{HB})}{(G_2+G_{D2}+j\omega C_2)}}{(G_1+G_{D1}+j\omega C_1)+(G_1+A)\frac{(G_{D1}+j\omega C_1)}{(G_2+G_{D2}+j\omega C_2)}}\right]\delta T_{HB}(\omega) \quad (38)$$

This equation is simplified by recognizing that the bath's heat capacity $C_{HB}$ is arbitrarily large. Incorporating this into Equation 38 with the fact that a is very large, we approximate and obtain a simplified expression and it is given by:

$$\delta V_O(\omega) = \left[\frac{G_2}{I_H}\right]\frac{j\omega C_{HB}}{[(G_{D1}+j\omega C_1)]}\delta T_{HB}(\omega) \quad (39)$$

The RMS noise produced by the thermal fluctuations in the heat bath 14 is obtained by using the power spectral density of a thermal body (term inside the integral and the square bracket in Equation 40). Converting Equation 39 into a power spectral density integral, the expression for the output noise voltage produced by the heat bath temperature becomes:

$$\delta V_O(T_{HB}) \approx \frac{G_2}{I_H}\sqrt{\int_0^\infty \frac{\omega^2 C_{HB}^2\left[\frac{4G_{D1}kT_{HB}^2}{G_{D1}^2+\omega^2 C_{HB}^2}\right]}{|(G_{D1}+j\omega C_1)|^2}\frac{d\omega}{2\pi}} \quad (40)$$

Equation 38 can be simplified by recognizing several conditions. The ratio $G_1/C_{HB}$ is very small, leading to factorization of the $\omega^2 C_{HB}^2$ terms inside the integral. Incorporating these approximations and integrating over frequency, we obtain a simple relationship given by:

$$\delta V_O(T_{HB}) \cong \left[\frac{G_2}{I_H}\right]\left[\frac{kT_{HB}^2}{C_1}\right]^{1/2} \quad (41)$$

This represents the RMS fluctuations in the output voltage of the amplifier 18 due to fluctuations in the temperature of the heat bath 14. The level is the minimum thermodynamic noise level possible and surprisingly is independent of the heat capacity of the heat bath 14 and dependent on the heat capacity of the detector 10.

(III.) Fluctuations in the temperature $T_D$ of the detector 10 will increase the fluctuations in the output noise voltage. Using the equivalent circuit in FIG. 6, we sum the power at node $T_D$, when $\delta Q_{IN} = \delta Q_H = 0$, and obtain the following expression:

$$\delta Q_D(\omega) = (G_1+G_{D1}+j\omega C_1)\delta T_D(\omega) - G_1\delta T_{IN}(\omega) \quad (42)$$

Using Equation 28, we eliminate the variable $\delta T_{IN}$ from Equation 42 and obtain the following expression:

$$\delta Q_D(\omega) = \left[G_{DI}+j\omega C_1 + \frac{G_1(G_2+G_{D2}+j\omega C_2)}{(G_1+G_2+G_{D2}+A+j\omega C_2)}\right]\delta T_D(\omega) \quad (43)$$

From previous computations with Equation 26, we obtain an expression for the noise voltage produced by temperature fluctuations in $T_D$, and it is given by:

$$\delta V_O[T_D(\omega)]I_H = A\left[1 - \frac{\delta T_{IN}}{\delta T_D}\right]\delta T_D \quad (44)$$

$$= A\left[\frac{G_2+G_{D2}+j\omega C_2}{G_1+G_2+G_{D2}+A+j\omega C_2}\right]\delta T_D(\omega)$$

Combining Equation 44 with Equation 43, we obtain an analytical solution for the spectral noise dependence due to fluctuations in the power $\delta Q_D$, and it is given by:

$$\delta V_O[T_D(\omega)]I_H = \frac{A\delta Q_D(\omega)}{\left[1 + \frac{(1+A)}{(G_2 + G_{D2} + j\omega C_2)}\right](G_{DI} + j\omega C_1) + G_1} \quad (45)$$

The power spectral density square of $\delta Q_D$ is given as $d^2Q_D/df = 4G_{D1}k_B(T_D)^2$, and combining this with the absolute square of equation 45, integrating and taking the square root we obtain the RMS voltage fluctuations in $\delta V_O(T_D)$, produced by $T_D$. Performing these operations, with some simplifications, we obtain:

$$\delta V_O(T_D) = \frac{G_2^* + G_{D2}}{I_H}\left[\frac{k_B T_D}{C_1}\right]^{1/2} \quad (46)$$

Figure 8:
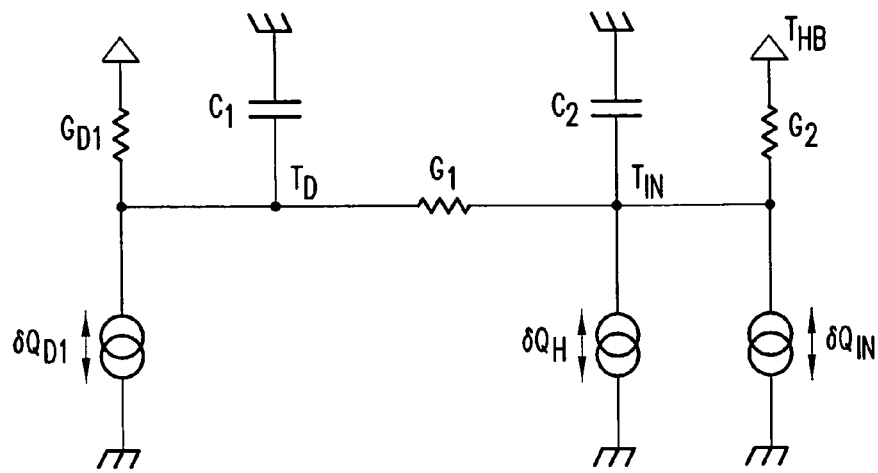
FIG. 8 is a thermal equivalent circuit for the noise sources due to thermal fluctuations in the embodiment shown in FIG. 5.

(IV.) Contributions from noise fluctuations in $\delta T_{IN}(\omega)$ to the output signal of the amplifier 18 are calculated similarly to contributions from $\delta T_D(\omega)$. Using the equivalent circuit in FIG. 8, we sum the power at node $T_D$, when $\delta Q_D = \delta Q_H = 0$, and obtain a relationship between $\delta T_D(\omega)$ and $\delta T_{IN}(\omega)$ given by:

$$\delta T_D(\omega) = \left[\frac{G_1}{(G_1 + G_{DI} + j\omega C_1)}\right]\delta T_{IN}(\omega) \quad (47)$$

Since we are calculating the effect of noise source $\delta Q_{IN}$, the temperature fluctuations $\delta T_{IN}(\omega)$ in Equation 47 shows that $|T_{IN}| > |T_D|$. Summing the power at node $T_{IN}$ in FIG. 8, we obtain a spectral power relationship given by:

$$\delta Q_{IN}(\omega) + \delta Q_H(\omega) = [G_1 + G_2 + G_{D2} + j\omega C_2]\delta T_{IN}(\omega) - G_1\delta T_D(\omega) \quad (48)$$

Using the fact that $\delta Q_H = A[\delta T_D - \delta T_{IN}]$, and Equation 47, we replace eliminate variable $\delta Q_H$ and $\delta T_D$ in Equation 48 and obtain:

$$\delta Q_{IN}(\omega) = \left[(G_2 + G_{D2} + j\omega C_2) + \frac{(A + G_1)(G_{DI} + j\omega C_1)}{(G_1 + G_{DI} + j\omega C_1)}\right]\delta T_{IN}(\omega) \quad (49)$$

Using Equation 26, we obtain an expression for the spectral fluctuations in the output voltage $V_O[T_{IN}(\omega)]$ produced by thermal fluctuations at node $T_{IN}$ and it is given by:

$$\delta V_O[T_{IN}(\omega)]I_H = -A\left[1 - \frac{\delta T_D}{\delta T_{IN}}\right]\delta T_{IN} \quad (50)$$

$$= -A\left[\frac{G_{DI} + j\omega C_1}{G_1 + G_{DI} + j\omega C_1}\right]\delta T_{IN}(\omega)$$

Combining Equations 49 and 50, to eliminate $\delta T_{IN}(\omega)$, we obtain an expression for the spectral voltage fluctuations at node $T_{IN}$ in terms of the spectral fluctuations in the black body radiation and this is given by:

$$\delta V_O[T_{IN}(\omega)]I_H = \frac{\delta Q_{IN}(\omega)}{\left[1 + \frac{G_1}{A} + \frac{(G_2 + G_{D2} + j\omega C_2)(G_1 + G_{DI} + j\omega C_1)}{A(G_{DI} + j\omega C_1)}\right]} \quad (51)$$

Since A is very large, Equation 51 reveals that the power associated with the spectral voltage fluctuations equals to the power in the power fluctuations in the black body radiation, regardless of the thermal electrical feedback loop. The power fluctuations at node $T_{IN}$ correspond to the classical temperature variance at $T_{IN}$ times the thermal conductivity from this node to the surroundings. Thus the RMS in voltage $V_O$, due to the thermal fluctuations at node $T_{IN}$, is given as:

$$\delta V_O[T_{IN}] = \frac{G_2 + G_{D2}}{I_H}\left[\frac{kT_{IN}^2}{C_2}\right]^{1/2} \quad (52)$$

With Equation 52, we complete calculating all the RMS contributions to the output voltage $V_O$ of the amplifier 18 produced by temperature fluctuations in $T_{HB}$, $T_S$, $T_D$ and $T_{IN}$. The remaining noise contribution is from the thermal electrical feedback circuit and this is computed below.

Figure 10:
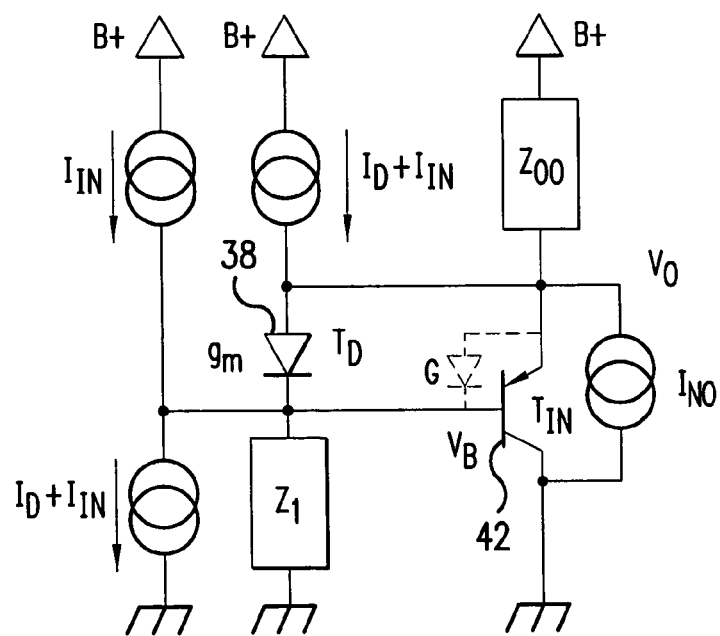
FIG. 10 is a functional equivalent circuit of the electro-thermal feedback circuit shown in FIG. 9; and, FIG. 11 is an electrical circuit diagram of an array of pixels shown in FIG. 5.

(V.) The noise from the readout and thermal electrical feedback circuit of the preferred embodiment of the invention shown in FIG. 9, including the bipolar transistor 42, contribute noise to the output signal as follows. This contribution is computed with the aid of the equivalent circuit of FIG. 9 shown in FIG. 10. For convenience, all the electrical noise terms have been included into the current generator labeled $I_{NO}$. This represents the noise present without any form of feedback. Additionally, this analysis is based on the fact that the noise in the circuit can be represented in terms of a Fourier representation with coefficients $I_{NO}$. Doing the analysis for an arbitrary frequency with amplitude $I_{NO}$, provides us with the expression for the noise with electrical thermal feedback.

The noise flowing in the circuit is affected by the electrical and electrical-thermal feedback present in the readout circuit shown in FIG. 9. Thus the current noise level without any feedback, INO, (FIG. 10) is modified to a new level in when feedback effects are included and it is given by:

$$I_{N0}(\omega) + [g_m + G_m][\delta V_B(\omega) - \delta V_O(\omega)] = I_N(\omega) \quad (53)$$

Where $g_M$ is the bipolar transistors' transconductance and $1/G_M$ is the diode's impedance. The voltage difference between base and emitter has an ac component and a thermal component, because the Fermi levels temperature dependence in the 'p' and 'n' regions of the diode and bipolar transistor. Accordingly, the base-emitter voltage difference for the bipolar transistor is given as:

$$V_B(\omega) - V_O(\omega) = \delta V_O(\omega)\left(\frac{Z_1}{Z_1 + 1/g_m} - 1\right) + \frac{\partial V_{BE}}{\partial T}(\delta T_D - \delta T_{IN}) \quad (54)$$

The first term on the right of Equation 54 represents the electrical division of the output voltage by the diode 38 in series with impedance $Z_1$, under the assumption that the base current is very small. The second term on the right of Equation 54 represents the change in the thermal voltage produced by temperature changes in the diode ($T_D$) and transistor ($T_{IN}$) temperatures. The coefficient $\partial V_{BE}/\partial T$ represent how change in the voltage per degree Kelvin, and typically, $\partial V_{BE}/\partial T \cong -2.3$ MV/K. The change in the output voltage $\delta V_O(\omega)$ is readily computed by including all the impedances at the output node and the actual noise current flowing, feedback effects included, and this is given by:

$$\delta V_O(\omega) = \left( \frac{(1/g_m + Z_1)Z_{OO}}{1/g_m + Z_1 + Z_{OO}} \right) I_N(\omega) \quad (55)$$

Incorporating Equation 55 into Equation 54, and after rearranging some terms, we obtain a better representation for Equation 53, and it is given by:

$$I_{NO}(\omega) = \qquad (56)$$
$$I_N(\omega)\left[1 + \frac{(G_m + g_m)Z_{OO}}{1 + g_m(Z_1 + Z_{OO})}\right] - (g_m + G_m)\frac{\partial V_{BE}}{\partial T}(\delta T_D - \delta T_{IN})$$

Observing Equation 56, it is evident that current $I_N$ is smaller that the original noise current $I_{N0}$ provided the thermal term in Equation 56 is positive, when expressed in terms of $I_N$. In fact, it will become evident that the electrical-thermal feedback term further reduces the noise current, and this is computed below.

Taking Equation 48 under the conditions that $\delta Q_{IN}(\omega)=0$, we obtain a relationship between $I_N(\omega)$, $\delta T_D(\omega)$, and $\delta T_{IN}(\omega)$ and it is given as:

$$-I_H \delta V_O(\omega) = (G_1 + G_2 + G_{D2} + j\omega C_2)\delta T_{IN}(\omega) - G_1 \delta T_D(\omega) \quad (57)$$

We have included a term $-I_H \delta V_O(\omega) = \delta Q_H(\omega)$, and it represent changes in power consumed at the intermediate stage caused by a change in the output voltage $\delta V_O(\omega)$ for dc current $I_H$ flowing into the output node. As the noise current increases, the output voltage decreases, and the quiescent power consumed by the intermediate stage also decreases, hence the minus sign on the left side of Equation 57. Earlier in Equation 47 we expressed a relationship between $\delta T_D(\omega)$ and $\delta T_{IN}(\omega)$.

Combining Equations 57 and 47, we eliminate $\delta T_D(\omega)$, and obtain $\delta T_{IN}(\omega)$ as a function of $I_H V_O(\omega)$, and it is given by $$\delta T_{IN}(\omega) = \frac{-I_H \delta V_O(\omega)(G_1 + G_{DI} + j\omega C_1)}{(G_1 + G_{DI} + j\omega C_1)(G_2 + G_{D2} + j\omega C_2) + G_1(G_{DI} + j\omega C_1)} \quad (58)$$

The right most term in Equation 56 is expressed in terms of $I_N(\omega)$ by replacing $\delta T_D(\omega)$ with Equation 47, and $\delta T_{IN}(\omega)$ with Equation 58, and $\delta V_O(\omega)$ with Equation 55. Performing all these substitutions and after some rearranging, we obtain an expression for $I_{NO}(\omega)$ in terms of $I_N(\omega)$ which is:

$$I_{NO}(\omega) = I_N(\omega)\left\{1 + \frac{(g_m + G_m)Z_{OO}}{1 + g_m(Z_1 + Z_{OO})} - \right. \qquad (59)$$

$$\left. \frac{(g_m + G_m)I_H \frac{\partial V_{BE}}{\partial T} \frac{(1 + g_m Z_1)Z_{OO}}{1 + g_m(Z_1 + Z_{OO})}}{\left[G_1 + \frac{(G_1 + G_{DI} + j\omega C_1)(G_2 + G_{D2} + j\omega C_2)}{(G_{DI} + j\omega C_1)}\right]} \right\}$$

The output noise voltage due to the readout and electrical-thermal feedback circuit is readily obtained by combining Equations 55 and 59 to obtain:

$$\delta V_O(\omega) = \frac{I_{NO}(\omega)}{\left\{ \frac{1 + g_m Z_1 + (2g_m + G_m)Z_{OO}}{(1 + g_m Z_1)Z_{OO}} - \frac{(g_m + G_m)I_H \frac{\partial V_{BE}}{\partial T}}{\left[G_1 + \frac{(G_1 + G_{DI} + j\omega C_1)(G_2 + G_{D2} + j\omega C_2)}{(G_{DI} + j\omega C_1)}\right]} \right\}} \quad (60)$$

There are two terms in the denominator that influence the output noise voltage: an electrical feedback term and a thermal feedback term. The value of $\partial V_{BE}/\partial T \cong -2.3$ MV/K is negative thereby removing the negative sign from the thermal term in the denominator. The issue is how large is the denominator in Equation 60, since the denominator determines how much the noise current gets attenuated by electrical and thermal feedback effects. The amount of attenuation is estimated by recognizing that $Z_1 \cong Z_{OO}$ and $10 g_M \cong G_M$, and that the thermal term is much smaller than the electrical term in the denominator of Equation 60. Incorporating these, Equation 60 is simplified to:

$$\delta V_O(\omega) = \frac{I_{NO}(\omega)}{\left[\frac{1}{Z_1}\frac{G_m}{g_m} + \frac{1}{Z_{OO}}\right]} \cong I_{NO}(\omega)Z_1 \frac{g_m}{G_M} \quad (61)$$

It should be noted that the smaller the ratio of $g_M/G_M$ is the more the noise is attenuated. This feature and the value of impedance $Z_1$ are used to minimize the noise from the readout and electrical-thermal feedback circuit. In our example, the ratio is ten to one, leading to a ten fold reduction in the electronic circuit noise.

The RMS output noise voltage is evaluated by utilizing Equation 61 and the noise power spectral density. A general expression for the noise power spectral density is given as:

$$\frac{d^2 I_{NO}(\omega)}{df} = I_{NO}^2\left[1 + \frac{B}{f}\right] \quad (62)$$

The noise power spectral density includes white noise and 1/f noise. The white noise power spectral density amplitude is given by a constant $[I_{N0}]^2$ and the 1/f noise corner frequency is represented by the constant B. For bipolar transistors, such as the transistor 42 shown in FIG. 9, the value of B is estimated to be about 1.0 KHz and could be as low as 100 Hz. The expression for the impedance $Z_1$ corresponds to a parallel combination of a resistance $R_{10}$ and capacitance $C_{10}$, and is given as $Z_1 = R_{10}/(1+j\omega R_{10} C_{10})$. Combining all these terms, the equation for the RMS value for the noise voltage is given by:

$$\delta V_O(\text{RMS}) = \frac{g_m}{G_m} I_{NO} R_{10} \sqrt{\left[\frac{1}{2\pi}\int_0^\infty \frac{dw}{1+R_{10}^2 C_{10}^2 \omega^2}\right] + \left[\frac{1}{2\pi}\int_{\omega_1}^\infty \frac{Bd\omega}{\omega(1+R_{10}^2 C_{10}^2 \omega^2)}\right]} \quad (63)$$

The absolute value squared is used for the impedance $Z_1$ because the calculation deals with RMS value of the noise. Additionally, the 1/f noise term is integrated not from zero do avoid divergence. Instead we selected a radial frequency $\omega_1$ which is connected to system calibration. Performing the integration on Equation 63 we obtain a closed form value for the electronic noise and it is given as:

$$\delta V_O(\text{RMS}) = \frac{g_m}{G_m} I_{NO} R_{10} \sqrt{\frac{1}{4R_{10}C_{10}} - \frac{B}{\pi}\text{Ln}[\omega_1 R_{10} C_{10}]} \quad (64)$$

The value of the RMS circuit noise voltage will be compared against the value of the noise voltages from thermal sources. Ideally, we should minimize the circuit voltage to achieve optimum performance.

Total Noise Voltage at MM Ultra Sensitive Silicon Sensor

The total noise at the output of the bolometer pixel 9 (FIG. 9) is the RMS sum of the results given in Equations 35, 41, 46, 52 and 64. Combining all these Equations, the expression for the total RMS noise voltage at the pixel's output is given by:

$$\delta V_O(\text{RMS}) \geq \frac{G_2}{I_H} \left[ \frac{\left(\frac{G_{AE}}{G_{D1}}\right)^2 \delta T_{SS}^2 + \left(\frac{kT_{HB}^2}{C_1}\right) + \left(\frac{kT_D^2}{C_1}\right) + \left(\frac{kT_{IN}^2}{C_2}\right) +}{\left(\frac{1}{4R_{10}C_{10}} - \frac{B}{\pi}\text{Ln}[\omega_1 R_{10}C_{10}]\right)\left(I_{NO} R_{10} \frac{g_m}{G_m} \frac{I_H}{G_2}\right)^2} \right]^{1/2} \quad (65)$$

The expression for the total RMS voltage noise includes contributions from: the scene, the heat bath 14, the detector 10, the intermediate stage 16, and the readout electronics including the bipolar transistor 18.

Several things are evident from Equation 65. Similar to the signal (see Equation 33), the noise from the scene signal (represented by the first term in the square brackets in Equation 65) is attenuated by $G_{AE}/G_D \approx 1/30$. This attenuation makes all the other noise sources more significant and degrades sensitivity. The second term in the square brackets represents the noise from the heat bath 14, and can be reduced by making $T_{HB}$ of the heat bath less than $T_S$ of the scene. The third term in the square brackets represents the noise from the detector 10 and the fourth term represent the noise term from the intermediate stage 16. The noise from the intermediate stage 16 can be minimized by making $C_1 \ll C_2$, while the thermal electrical feedback insures that $T_D \approx T_{IN}$. The last term represents the electronic readout noise. For best performance, the electronic noise should be less than the thermal noise terms associated with the MM USSS. Specifically, the terms in the square brackets in Equation 65, given by $(kT_D^2/C_1)$, that is approximately equal to $(kT_{HB}^2/C_1)$, since $T_{HB} \approx T_D$. The value of this term can be readily estimated by recognizing that $T_D \approx 300K$. The detector's heat capacity $C_1$ is estimated to be equal $C^1 \cong 1.56 \times 10^{-11}$ J/K, corresponding to the heat capacity of a 5 μm diameter silicon membrane 0.5 μm thick, and K=1.38×10⁻²³J/K. Combining all these terms, the value calculated for $(kT^{D2}/C_1) \cong 8 \times 10^{-8}$ K². The ultimate sensitivity is achieved when the leading term in the square brackets is larger than all the other terms. Given that the ration $G_{AE}/G_{D1}$1/30, we conclude that the sensor is limited by the RMS sum of its own thermal fluctuations {second third an forth terms in the square bracket of Equation 65} and the value of the electronic readout noise, fifth term in the square brackets of Equation 65. The sensitivity of the MM USSS is evaluated in the next section.

Noise Equivalent Radiometric Temperature of MM USSS

The Noise Equivalent Radiometric Temperature of the MM USSS {NERΔT} represent the minimum temperature the MM USSS can resolve, and it occurs at a unity signals to noise ratio. Mathematically, this is obtained by dividing the noise voltage, given by Equation 65, by the absolute responsivity, given by Equation 33, and after some rearrangements and the approximation that $G_1 \ll G_2$, we obtain:

$$\text{NER}\Delta T \geq \frac{G_{D1}}{G_{AE}} \left[ \frac{\left(\frac{G_{AE}}{G_{D1}}\right)^2 \delta T_{SS}^2 + \left(\frac{kT_{HB}^2}{C_1}\right) + \left(\frac{kT_D^2}{C_1}\right) + \left(\frac{kT_{IN}^2}{C_2}\right) +}{\left(\frac{1}{4R_{10}C_{10}} - \frac{B}{\pi}\text{Ln}[\omega_1 R_{10}C_{10}]\right)\left(I_{NO} R_{10} \frac{g_m}{G_m} \frac{I_H}{G_2}\right)^2} \right]^{1/2} \left[ \frac{1+\left(\frac{\omega C_1}{G_{D1}}\right)^2}{1+\left(\frac{\omega C_2}{G_2}\right)^2} \right]^{1/2} \quad (66)$$

The expression for the MM USSS sensitivity is given as a product of three terms: degradation due to thermal loading $[G_1/G_{AE}]$, noise from thermal fluctuations and electronic circuits, and a 'ac' factor which represents the frequency response of the detector 10 and intermediate stage 16. We will proceed to address each one of these terms in detail.

The first term is the degradation in sensitivity produced by the thermal loading from $G_{D1}$ versus the conductance between the detector and scene $G_{AE}$. Since $G_1/G_{AE} \approx 30$, this represents a significant degradation. Electrical-thermal feedback has reduced this from $G_1/G_{AE} \approx 2400$ to $G_{D1}/G_{AE} \approx 30$. This represents almost a 100-fold improvement over conventional approaches and clearly illustrates the excellent reason for proposing the MM USSS, which is greatly improved sensitivity.

The terms in the square bracket represent all the noise sources. We can neglect the first term because of the large attenuation factor in front $[G_{AE}/G_{D1}]^2 \approx 1/900$. The combination of the second, third, and fourth term in the square bracket is readily evaluated since we know that from before that $(KT_D^2/C_1) \cong 8 \times 10^{-8}$ K$^2$. The heat bath 14 and intermediate stage temperatures 16 are approximated to be about the same as the detector 10 $[T_D \approx T_{HB} \approx T_{IN}]$ and 10 $C_1 \cong C_2$. Combining the second, third, and fourth term in the square brackets, we obtain an estimate of about $2 \times 10^{-7}$ K$^2$. It should be noted that these three terms by themselves limit the sensitivity to more that 0.013 K.

Unfortunately, this excellent performance is degraded by the electronic circuit noise, given by the fifth term in the square brackets of Equation 66. The degradation is readily estimated by substituting numerical values. By design, $R_{10} \approx 10^8$, $C_{10} \approx 1$PF, $G_M/G_M \approx 0.1$, $I_H/G_2 \approx 10$, B$\approx$1 KHz and the white noise power spectral density of the bipolar amplifier 18 is $[I_{N0}]^2(8/3)EI_H$ and estimated as equal to $4.3 \times 10^{-25}$. Combining all these, the electronic circuit noise term becomes:

$$\text{Electronic Noise} = 4.2 \times 10^{-9} \left( 2.5 \times 10^3 - \frac{10^3}{\pi} \text{Ln}[10^{-4}\omega_1] \right) K^2 \quad (67)$$

The electronic noise includes white noise (first term) and 1/f noise (second term). The total noise depends on the low frequency operating corner $\omega_1$ of the sensor. The 1/f noise term is the larger of the two noise terms and depends on the operating corner $\omega_1$. If we assume that calibration is performed once every hour, automatically, then the value of Equation 67 becomes $3.2 \times 10^{-5}$ K$^2$. This is much larger than the sum of all the detector's thermal noise term of $2 \times 10^{-7}$ K$^2$. Inserting the numerical results from Equation 67 into Equation 66 we obtain an estimate for the radiometric temperature resolution and it is 0.2 K. This is represents a prediction of excellent performance for a MM USSS.

From the analyses presented above and the embodiment of the invention disclosed herein, it indicates that the present invention is particularly adapted for passive MM wave imaging. Passive millimeter wave imaging offers several important features including seeing through clothing, through clouds, and during rain. The former characteristic offers application for home defense for remote weapons and explosive detection. The latter characteristic offers improved visibility for military platforms deployed over land, in the air and at sea.

Furthermore, the sensor when made with a monolithic design, on a single silicon wafer, obviates the need of any microwave mixers. Such a simplification in circuitry will directly lead to a significant reduction in cost of fabricating millimeter wave imagers.

Having thus shown and described what is at present considered to be the preferred embodiments of USSS pixel invention, it should be noted that all modifications, changes and alterations coming within the spirit and scope of the invention as set forth in the appended claims are also meant to be included.

The invention claimed is:

1. An electromagnetic radiation sensor assembly, comprising:
    a heat bath;
    an antenna element for receiving radiant electromagnetic energy;
    a thermally responsive absorber element coupled to the antenna element and including means for absorbing and detecting radiant electromagnetic energy received by said antenna element;
    an intermediate stage for thermally isolating the absorber element from the heat bath, said intermediate stage including at least two first and at least two second thermal isolation members each having a predetermined thermal conductance interconnecting the absorber element to the intermediate stage and the intermediate stage to the heat bath, the first thermal isolation members being located between the absorber element and the intermediate stage and the second thermal isolation members being located between the intermediate stage and the heat bath;
    an electro-thermal feedback circuit incorporated into the intermediate stage for reducing the thermal conductivity between the absorber element and the heat bath by causing the temperature of the intermediate stage to converge to the temperature of the absorber element when detecting electromagnetic radiation, thus effectively causing the thermal conductance of the first thermal isolation members to attain a minimum conductance value and thereby improve the sensitivity of the radiation sensor towards the radiation limit; and
    wherein the electro-thermal feedback circuit includes a heat generating amplifier including a bipolar transistor integrated with the intermediate stage and means for detecting the temperature difference between the absorber element and the intermediate stage and generating an output voltage signal dependent on the received electromagnetic radiation to control the power generated by the amplifier, wherein the heat generated by the transistor included in the amplifier itself directly heats the intermediate stage in response to said temperature difference signal so as to equalize the temperature between the absorber element and the intermediate stage.

2. A sensor assembly according to claim 1 wherein said sensor assembly comprises a two-tier device and wherein said antenna element, said absorber element and said intermediate stage comprises substantially co-planar elements located above the heat bath.

3. A sensor assembly according to claim 2 wherein said intermediate stage includes a support member and, wherein said support member and said first and second isolation members form a bridge for positioning the absorber element above the means providing a heat bath.

4. A sensor assembly according to claim 3 wherein said heat bath includes a substrate and an upper body portion on which the antenna element is mounted, said upper body portion including a cavity over which the intermediate stage and the absorber element are located.

5. A sensor assembly according to claim 2 wherein said amplifier including a bipolar transistor comprises an amplifier and wherein said means for detecting the temperature difference includes first and second diodes for respectively sensing the temperature difference between said absorber element and said intermediate stage.

6. A sensor assembly according to claim 5 wherein the first and second diodes are connected in back-to-back circuit relationship and to the amplifier inputs.

7. A sensor assembly according to claim 1 wherein said antenna element is located on an upper outer surface of said heat bath.

8. A sensor assembly according to claim 7 wherein said intermediate stage includes a centralized opening therein and wherein said absorber element is located in said opening.

9. A sensor assembly according to claim 1 wherein the assembly comprises an x-y sensor assembly including x-y address readout circuits, and wherein said heat bath, said antenna element, said absorber element and said intermediate stage form a single pixel addressed by the x-y address readout circuits.

10. A sensor assembly according to claim 9 wherein said predetermined region also includes millimeter wave region of the electromagnetic spectrum.

11. A sensor assembly according to claim 9 wherein said absorber element comprises a bolometer.

12. A sensor assembly according to claim 9 wherein said absorber element includes resistor means and temperature sensor means, wherein said resistor means is ac coupled to the antenna to receive and absorb the electromagnetic energy, and said temperature sensor means is thermally coupled to the resistor means to monitor its temperature.

13. A sensor assembly according to claim 9 wherein said pixel is fabricated in silicon.

14. A sensor assembly according to claim 9 wherein a plurality of said pixels are included in an array of pixels.

15. A sensor assembly according to claim 1 wherein the spectral response of at least one of the elements including said absorber element and said antenna element is adjusted to operate in a predetermined region of the electromagnetic spectrum, including at least the infrared region of the electromagnetic spectrum.

16. An electromagnetic radiation sensor assembly, comprising:
an array of sensor pixels, each of said pixels including,
a heat sink in the form of a heat bath member,
an antenna element for receiving radiant electromagnetic energy mounted on the heat bath member,
a thermally sensitive detector element coupled to the antenna element for detecting the radiant electromagnetic energy,
an intermediate stage located between the detector element and the heat bath member, and
a support structure for the intermediate stage comprising at least two first thermal isolation members having a predetermined thermal and electrical conductance connecting the detector element to the intermediate stage and at least two second thermal isolation members having a predetermined thermal and electrical conductance connecting the intermediate stage to the common heat bath member;
an electro-thermal feedback circuit in the intermediate stage for reducing the thermal conductivity between the detector element and the heat bath member by causing the temperature of the intermediate stage to converge to the temperature of the detector element in response to absorbed electromagnetic radiation, effectively causing the thermal conductance of the first thermal isolation members to attain a minimum conductance value and thereby improve thermal isolation and thus the sensitivity of the sensor element toward the radiation limit; and,
wherein the electro-thermal feedback circuit includes a heat generating amplifier, including a bipolar transistor, integrated with the intermediate stage as well as means for detecting the temperature difference between the detector element and the intermediate stage and generating a temperature difference signal for controlling the solid bipolar transistor and the heat generated thereby; and, wherein the heat generated by the bipolar transistor itself directly heats the intermediate stage in response to said temperature difference signal so as to converge the temperature of the intermediate stage to the temperature of the detector element.

17. An electromagnetic assembly according to claim 16 wherein the antenna element, the detector element, the intermediate stage are substantially coplanar in a two tier assembly with the heat bath.

18. A sensor assembly according to claim 16 wherein said detector element comprises a bolometer.

19. A sensor assembly according to claim 16 wherein the spectral response of at least one of the elements including the detector element and the antenna element is adjusted to operate in a predetermined region of the electromagnetic spectrum.

20. A sensor assembly according to claim 19 wherein the predetermined region includes the infrared and/or millimeter wave region of the electromagnetic spectrum.

21. An electromagnetic radiation sensor assembly, comprising:
heat bath means;
antenna means located on an outer surface of the heat bath means for receiving electromagnetic radiation;
heat absorber means for detecting electromagnetic radiation received by the antenna means;
an intermediate stage located between the heat bath means and the heat absorber means;
thermal isolation means located between the intermediate stage and the heat bath means and the heat absorber means for thermally isolating the heat absorber means from the heat bath means;
first means having a predetermined thermal and electrical conductance for connecting the heat absorber means to the thermal isolation means, and
second means having a predetermined thermal and electrical conductance for connecting the thermal isolation means to the heat bath means; and,
electro-thermal feedback circuit means incorporated into the thermal isolation means for reducing the thermal conductivity between the heat absorber means and the heat bath means by causing the temperature of the thermal isolation means to converge to the temperature of the heat absorber means when detecting electromagnetic radiation, effectively causing the thermal conductance of the first means for connecting to attain a minimum conductance value and thereby improve the sensitivity of the sensor assembly toward the radiation limit;
wherein the electro-thermal feedback circuit means includes heat generating bipolar transistor amplifier means integrated with the thermal isolation means, and means for detecting the temperature difference between the heat absorber means and the thermal isolation means and generating a temperature difference signal for controlling the power delivered by the bipolar transistor amplifier to the intermediate stage; and,
wherein the heat generated by the bipolar transistor amplifier means directly heats the thermal isolation means in response to said temperature difference signal so as to equalize the temperature between the heat absorber means and the intermediate stage.

22. A sensor assembly according to claim 21 wherein said antenna means, said heat absorber means, and said thermal isolation means form a two-tier sensor assembly.

23. An electromagnetic radiation sensor assembly, comprising: heat bath means;
   antenna means located on the heat bath means for receiving electromagnetic radiation;
   heat absorber means for detecting electromagnetic radiation received by the antenna means;
   an intermediate stage located between the heat bath means and the heat absorber means;
   thermal isolation means located between the intermediate stage and the heat bath means and the heat absorber means for thermally isolating the heat absorber means from the heat bath means;
   first means having a predetermined thermal and electrical conductance for connecting the heat absorber means to the thermal isolation means, and second means having a predetermined thermal and electrical conductance for connecting the thermal isolation means to the heat bath means; and,
   electro-thermal feedback circuit means incorporated into the thermal isolation means for reducing the thermal conductivity between the heat absorber means and the heat bath means by causing the temperature of the thermal isolation means to converge to the temperature of the heat absorber means when detecting electromagnetic radiation, effectively causing the thermal conductance of the first means for connecting to attain a minimum conductance value and thereby improve the sensitivity of the sensor assembly toward the radiation limit;
   wherein the electro-thermal feedback circuit means includes heat generating amplifier means integrated with the thermal isolation means, and means for detecting the temperature difference between the heat absorber means and the thermal isolation means and generating a temperature difference signal for controlling the power delivered by the amplifier means to the intermediate stage; and, wherein the heat generated by the amplifier means directly heats the thermal isolation means in response to said temperature difference signal so as to equalize the temperature between the heat absorber means and the intermediate stage.

24. A radiation sensor assembly according to claim 23 wherein the antenna means is located on an outer surface of the heat bath means.

25. A sensor assembly according to claim 23 wherein said antenna means, said heat absorber means, and said thermal isolation means form a two-tier sensor assembly.

26. An electromagnetic radiation sensor assembly, comprising: a heat bath;
   an antenna element mounted on the heat bath for receiving incident radiant electromagnetic energy;
   a thermally responsive absorber element coupled to the antenna element and including means for absorbing and detecting radiant electromagnetic energy received by said antenna element;
   an intermediate stage for thermally isolating the absorber element from the heat bath, said intermediate stage including a support member and at least two first and at least two second thermal isolation members each having a predetermined thermal conductance interconnecting the absorber element to the intermediate stage and the intermediate stage to the heat bath;
   wherein the support member and the first and second isolation members form a bridge for positioning the absorber element above the heat bath;
   wherein the heat bath includes a substrate and an upper body portion on which the antenna element is mounted, the upper body portion including a cavity over which the intermediate stage and the absorber element are located;
   an electro-thermal feedback circuit incorporated into the intermediate stage for reducing the thermal conductivity between the absorber element and the heat bath by causing the temperature of the intermediate stage to converge to the temperature of the absorber element when detecting electromagnetic radiation, thus effectively causing the thermal conductance of the first thermal isolation members to attain a minimum conductance value and thereby improve the sensitivity of the radiation sensor towards the radiation limit; and
   wherein the electro-thermal feedback circuit includes a heat generating amplifier and means for detecting the temperature difference between the absorber element and the intermediate stage and generating an output voltage signal dependent on the received electromagnetic radiation to control the power generated by the amplifier, wherein the heat generated by the amplifier itself directly heats the intermediate stage in response to said temperature difference signal so as to equalize the temperature between the absorber element and the intermediate stage.

27. A radiation sensor assembly according to claim 26 wherein the heat generating amplifier includes semiconductor amplifier means.

28. A radiation sensor assembly according to claim 27 wherein said semiconductor amplifier means includes at least one semiconductor amplifying device.

29. A radiation sensor assembly according to claim 28 wherein said at least one semiconductor amplifying device comprises a transistor of a predetermined type integrated with the intermediate stage.

30. A radiation sensor assembly according to claim 29 wherein the transistor comprises a bipolar transistor.

* * * * *